United States Patent
Yang et al.

(10) Patent No.: US 11,765,685 B2
(45) Date of Patent: Sep. 19, 2023

(54) ENHANCEMENT ON MMW SCG MEASUREMENT CONFIGURATION AND ADDING/SWITCHING

(71) Applicant: QUALCOMM Incorporated, San Diego, CA (US)

(72) Inventors: Ming Yang, San Diego, CA (US); Kausik Ray Chaudhuri, San Diego, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 168 days.

(21) Appl. No.: 17/404,850

(22) Filed: Aug. 17, 2021

(65) Prior Publication Data

US 2023/0053572 A1   Feb. 23, 2023

(51) Int. Cl.
  *H04W 64/00* (2009.01)
  *H04W 60/04* (2009.01)
  *H04W 24/10* (2009.01)

(52) U.S. Cl.
  CPC ......... *H04W 64/006* (2013.01); *H04W 24/10* (2013.01); *H04W 60/04* (2013.01)

(58) Field of Classification Search
  CPC ..... H04W 24/10; H04W 24/02; H04W 72/02; H04W 50/04; H04W 64/006
  See application file for complete search history.

(56) References Cited

U.S. PATENT DOCUMENTS

| | | | |
|---|---|---|---|
| 2020/0236579 A1* | 7/2020 | Cho | H04W 24/10 |
| 2021/0028976 A1* | 1/2021 | Jia | H04L 41/0654 |
| 2022/0104178 A1* | 3/2022 | Lee | H04W 72/02 |
| 2023/0026279 A1* | 1/2023 | Kumar | H04W 24/02 |
| 2023/0053572 A1* | 2/2023 | Yang | H04W 24/10 |

FOREIGN PATENT DOCUMENTS

| | | | | |
|---|---|---|---|---|
| WO | WO-2020145785 A1 * | 7/2020 | | H04W 64/006 |
| WO | WO-2021024049 A1 * | 2/2021 | | H04W 24/02 |

OTHER PUBLICATIONS

A. Koutsaftis, M. F. Özkoç, F. Fund, P. Liu and S. S. Panwar, "Fast Wireless Backhaul: A Multi-Connectivity Enabled mmWave Cellular System," GLOBECOM 2022—2022 IEEE Global Communications Conference, Rio de Janeiro, Brazil, 2022, pp. 1813-1818, doi: 10.1109/GLOBECOM48099.2022.10001455. (Year: 2022).*

* cited by examiner

*Primary Examiner* — William D Cumming
(74) *Attorney, Agent, or Firm* — Procopio, Cory, Hargreaves & Savitch LLP

(57) ABSTRACT

A UE may receive information associated with an MCG. The UE may train, based on at least one of the information associated with the MCG or historical information of the UE for an SCG, an ML model that indicates whether a location of the UE is within a coverage area of the SCG. The UE may communicate with a base station based on an indication of the ML model. The indication of the ML model may be indicative of whether the UE is within the coverage area of the SCG.

52 Claims, 13 Drawing Sheets

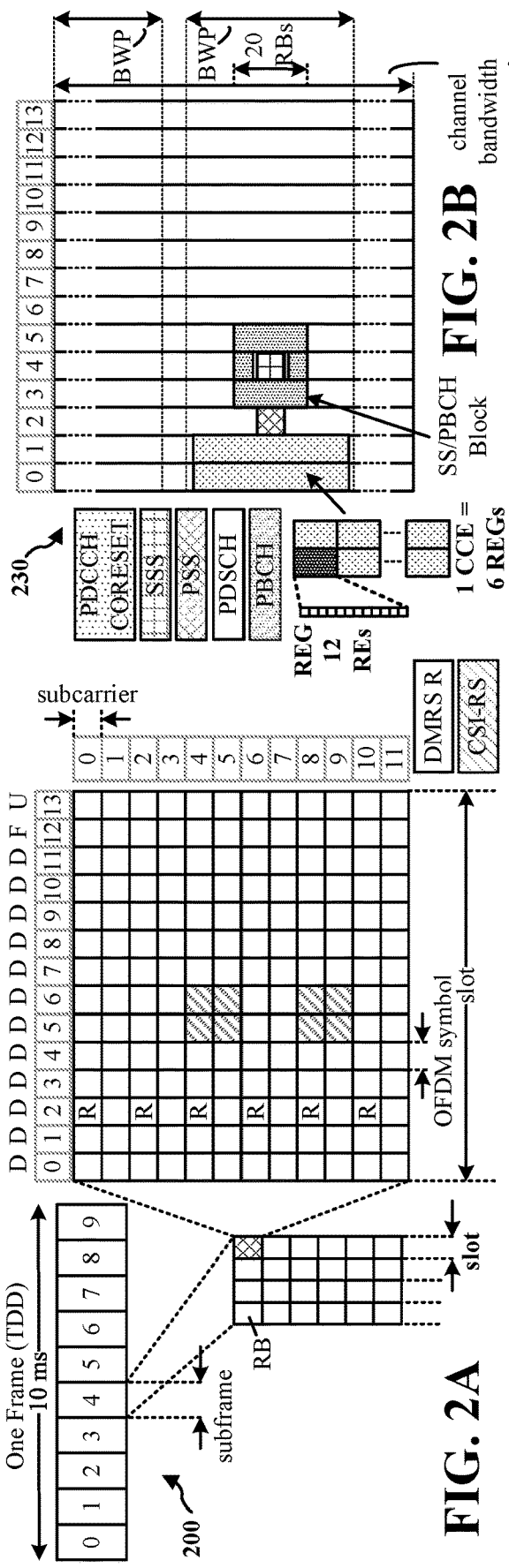
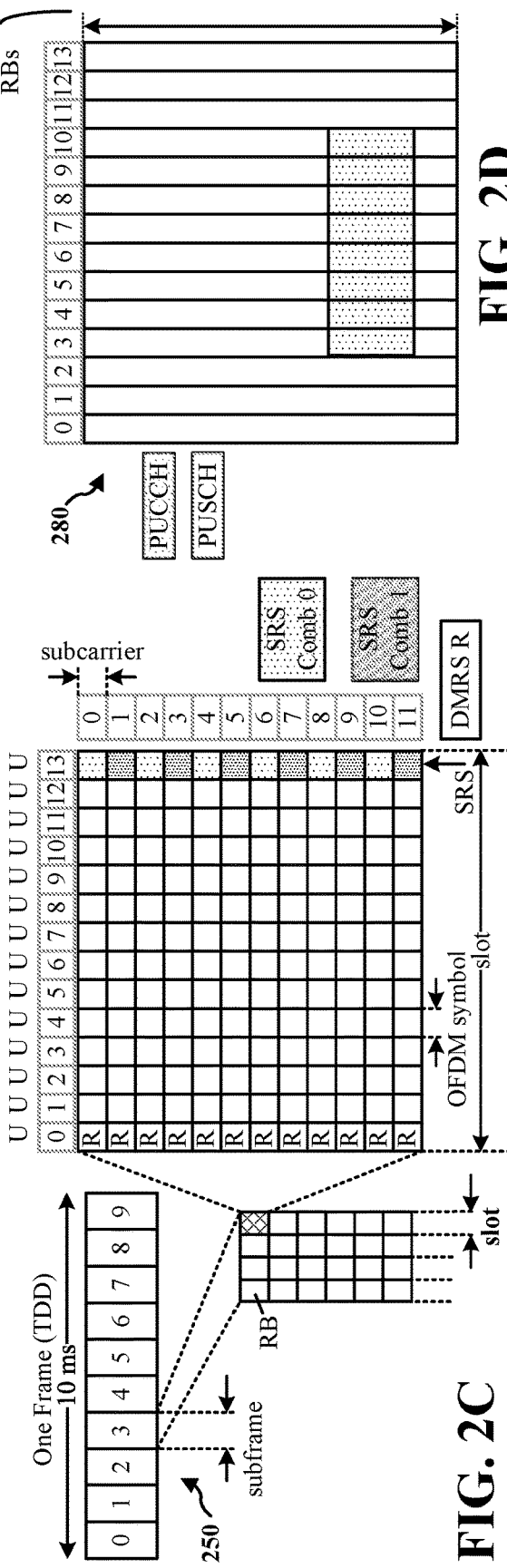
FIG. 2A
FIG. 2B
FIG. 2C
FIG. 2D

ENHANCEMENT ON MMW SCG MEASUREMENT CONFIGURATION AND ADDING/SWITCHING

TECHNICAL FIELD

The present disclosure relates generally to communication systems, and more particularly, to a secondary cell group (SCG) measurement configuration and adding/switching enhancement.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communication (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may receive information associated with a master cell group (MCG); train, based on at least one of the information associated with the MCG or historical information of a user equipment (UE) for a secondary cell group (SCG), a machine learning (ML) model that indicates whether a location of the UE is within a coverage area of the SCG; and communicate with a base station based on an indication of the ML model, the indication of the ML model indicative of whether the UE is within the coverage area of the SCG.

In another aspect of the disclosure, a method, a computer-readable medium, and an apparatus are provided. The apparatus may receive at least one of information associated with an MCG or historical information for an SCG; train, based on the at least one of the information associated with the MCG or the historical information for the SCG, an ML model that indicates whether a location of at least one UE is within a coverage area of the SCG; and communicate with the at least one UE based on an indication of the ML model, the indication of the ML model indicative of whether the at least one UE is within the coverage area of the SCG.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first frame, in accordance with various aspects of the present disclosure.

FIG. 2B is a diagram illustrating an example of downlink (DL) channels within a subframe, in accordance with various aspects of the present disclosure.

FIG. 2C is a diagram illustrating an example of a second frame, in accordance with various aspects of the present disclosure.

FIG. 2D is a diagram illustrating an example of uplink (UL) channels within a subframe, in accordance with various aspects of the present disclosure.

DETAILED DESCRIPTION

Figure 1:
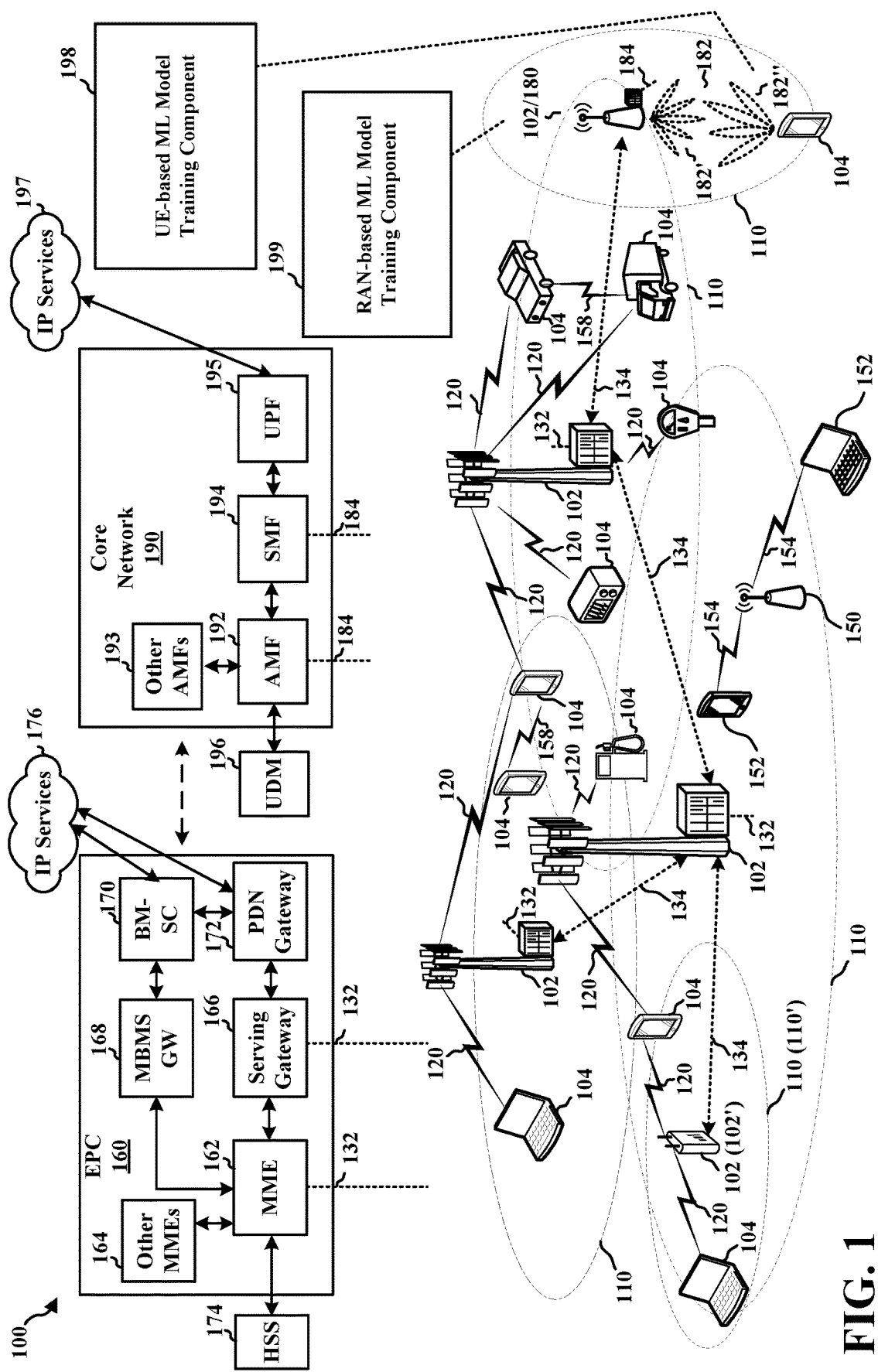
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, user equipments (UEs) 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth™, ZigBee, Wi-Fi™ based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may include a UE-based machine learning (ML) model training component 198 configured to receive information associated with a master cell group (MCG); train, based on at least one of the information associated with the MCG or historical information of the UE for a secondary cell group (SCG), an ML model that indicates whether a location of the UE is within a coverage area of the SCG; and communicate with a base station based on an indication of the ML model, the indication of the ML model indicative of whether the UE is within the coverage area of the SCG. In certain aspects, the base station 180 may include a RAN-based ML model training component 199 configured to receive at least one of information associated with an MCG or historical information for an SCG; train, based on the at least one of the information associated with the MCG or the historical information for the SCG, an ML model that indicates whether a location of at least one UE is within a coverage area of the SCG; and communicate with the at least one UE based on an indication of the ML model, the indication of the ML model indicative of whether the at least one UE is within the coverage area of the SCG. Although the following description may be focused on 5G NR, the concepts described herein may be applicable to other similar areas, such as LTE, LTE-A, CDMA, GSM, and other wireless technologies.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| $\mu$ | SCS $\Delta f = 2^{\mu} \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^{\mu}$ slots/subframe. The subcarrier spacing may be equal to $2^{\mu}*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame.

The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
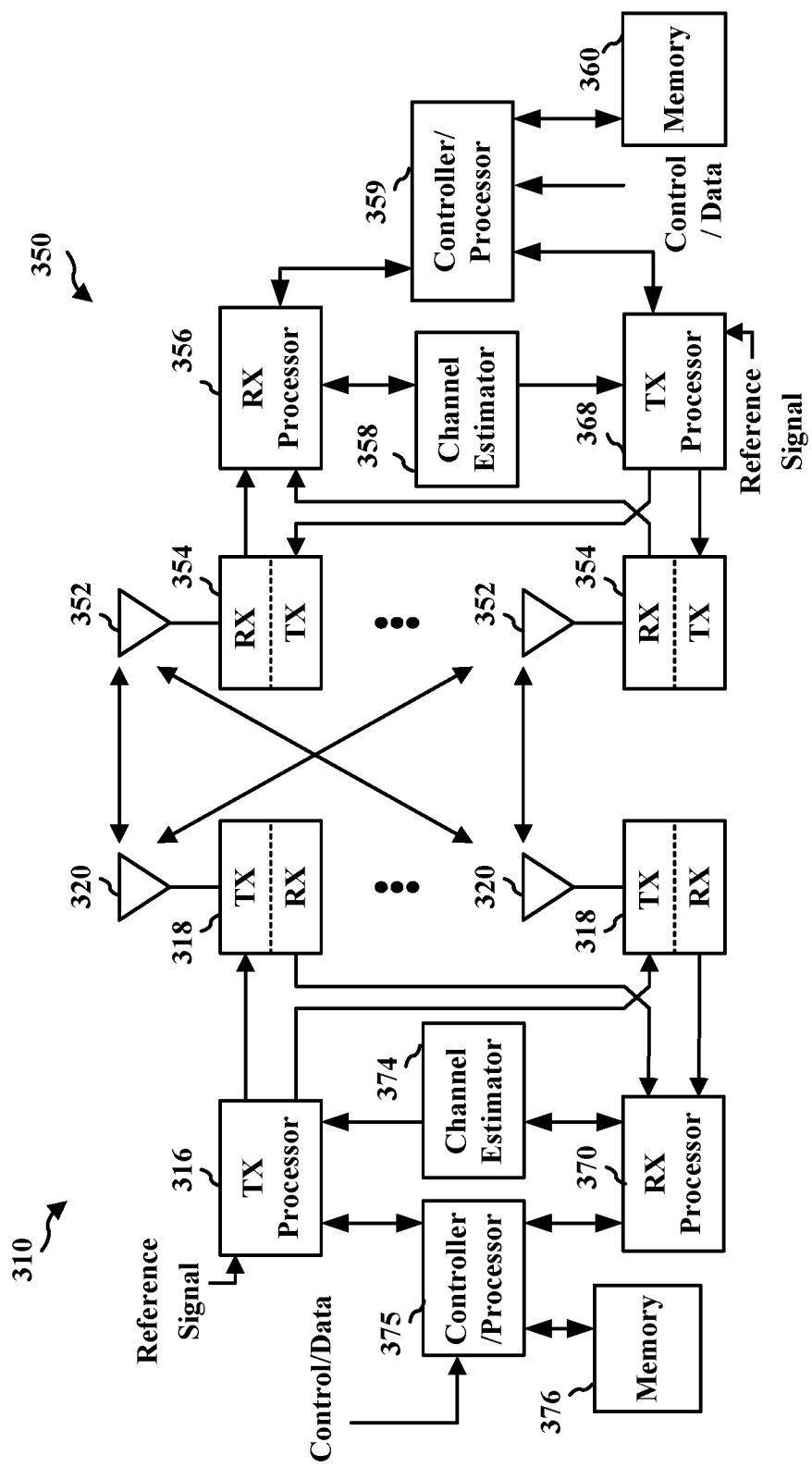
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the UE-based ML model training component 198 of FIG. 1.

At least one of the TX processor 316, the RX processor 370, and the controller/processor 375 may be configured to perform aspects in connection with the RAN-based ML model training component 199 of FIG. 1.

Wireless communication systems may be configured to share available system resources and provide various telecommunication services (e.g., telephony, video, data, messaging, broadcasts, etc.) based on multiple-access technologies such as CDMA systems, TDMA systems, FDMA systems, OFDMA systems, SC-FDMA systems, TD-SCDMA systems, etc. that support communication with multiple users. In many cases, common protocols that facilitate communications with wireless devices are adopted in various telecommunication standards. For example, communication methods associated with eMBB, mMTC, and ultra-reliable low latency communication (URLLC) may be incorporated in the 5G NR telecommunication standard, while other aspects may be incorporated in the 4G LTE standard. As mobile broadband technologies are part of a continuous evolution, further improvements in mobile broadband remain useful to continue the progression of such technologies.

Figure 4:
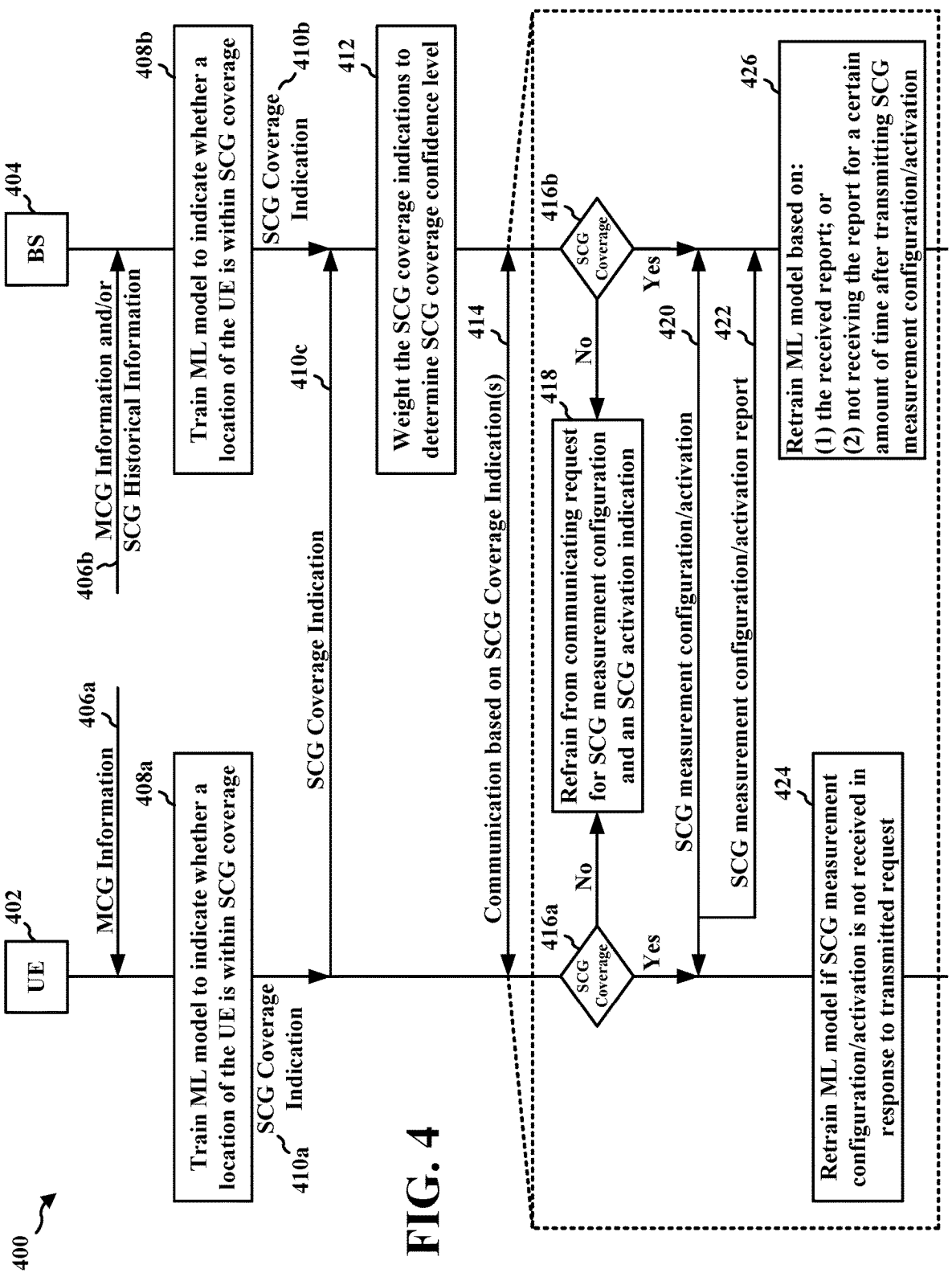
FIG. 4 is a call flow diagram illustrating communications between a UE and a base station.

FIG. 4 is a call flow diagram 400 illustrating communications between a UE 402 and a base station 404. At 406, the UE 402 may receive MCG information, which may be associated with an RSRP of an MCG serving cell, an RSRP of an MCG neighbor cell, an RSRP of a serving/non-serving beam of the MCG serving cell, and/or an RSRP of a strongest beam or other beam of the MCG neighbor cell. At 408a, the UE 402 may train an ML model (e.g., based on the MCG information) to indicate whether a location of the UE is within SCG coverage. At 410a, the ML model trained at the UE may output an SCG coverage indication. The SCG coverage indication may be transmitted, at 410c, to the base station 404.

The base station 404 may perform a similar procedure to the UE 402. That is, the base station 404 may receive, at 406b, MCG information and/or SCG historical information from at least one UE, such as the UE 402. The MCG information may be associated with an RSRP of an MCG serving cell, an RSRP of an MCG neighbor cell, an RSRP of a serving/non-serving beam of the MCG serving cell, and/or an RSRP of a strongest beam or other beam of the MCG neighbor cell. The historical information from the at least one UE may be associated with SCG reporting and/or adding/switching techniques for a percentage of UEs with the cell. At 408b, the base station 404 may train a different ML model (e.g., based on the MCG information and/or the SCG historical information) to indicate whether a location of the UE 402 is within SCG coverage. At 410b, the different ML model trained at the base station 404 may output a second SCG coverage indication.

The second SCG coverage indication, at 410b, may be associated with the SCG coverage indication received, at 410c, from the UE 402. For example, the base station 404 may apply a weight, at 412, for the SCG coverage indications (i.e., "weight" the SCG coverage indications) to determine an SCG coverage confidence level. That is, the first SCG coverage indication received, at 410c, may be weighed, at 412, with the second SCG coverage indication, at 410b, to determine an overall accuracy/confidence level for the SCG coverage of the UE 402. At 414, the UE 402 and the base station 404 may communicate based on the SCG coverage indication(s).

The communication, at 414, may be based on an SCG coverage determination. For example, the UE 402 may determine, at 416a, whether the UE 402 has SCG coverage. If the UE 402 determines, at 416a, that the UE 402 does not have SCG coverage, the UE 402 may refrain, at 418, from communicating a request for SCG measurement configuration and an SCG activation indication. The base station 404 may perform a similar procedure to the UE 402. That is, the base station 404 may determine, at 416b, whether the UE 402 has SCG coverage. If the base station 404 determines, at 416b, that the UE 402 does not have SCG coverage, the base station 404 may refrain, at 418, from communicating a request for SCG measurement configuration and an SCG activation indication.

If the UE 402 determines, at 416a, and/or the base station 404 determines, at 416b, that the UE 402 has SCG coverage, an SCG measurement configuration/activation may be communicated between the UE 402 and the base station 404. At 422, the UE 402 may transmit an SCG measurement configuration/activation report to the base station 404. At 424, the UE 402 may retrain the ML model if an SCG measurement configuration/activation is not received from the base station 404 in response to a transmitted request for the SCG measurement configuration/activation. At 426, the base station may likewise retrain the ML model. For example, at 426(1), the base station 404 may retrain the ML model based on the received report, at 422. At 426(2), the base station 404 may retrain the ML model based on not receiving the report for a certain amount of time after transmitting, at 420, the SCG measurement configuration/activation to the UE 402.

Figure 5:
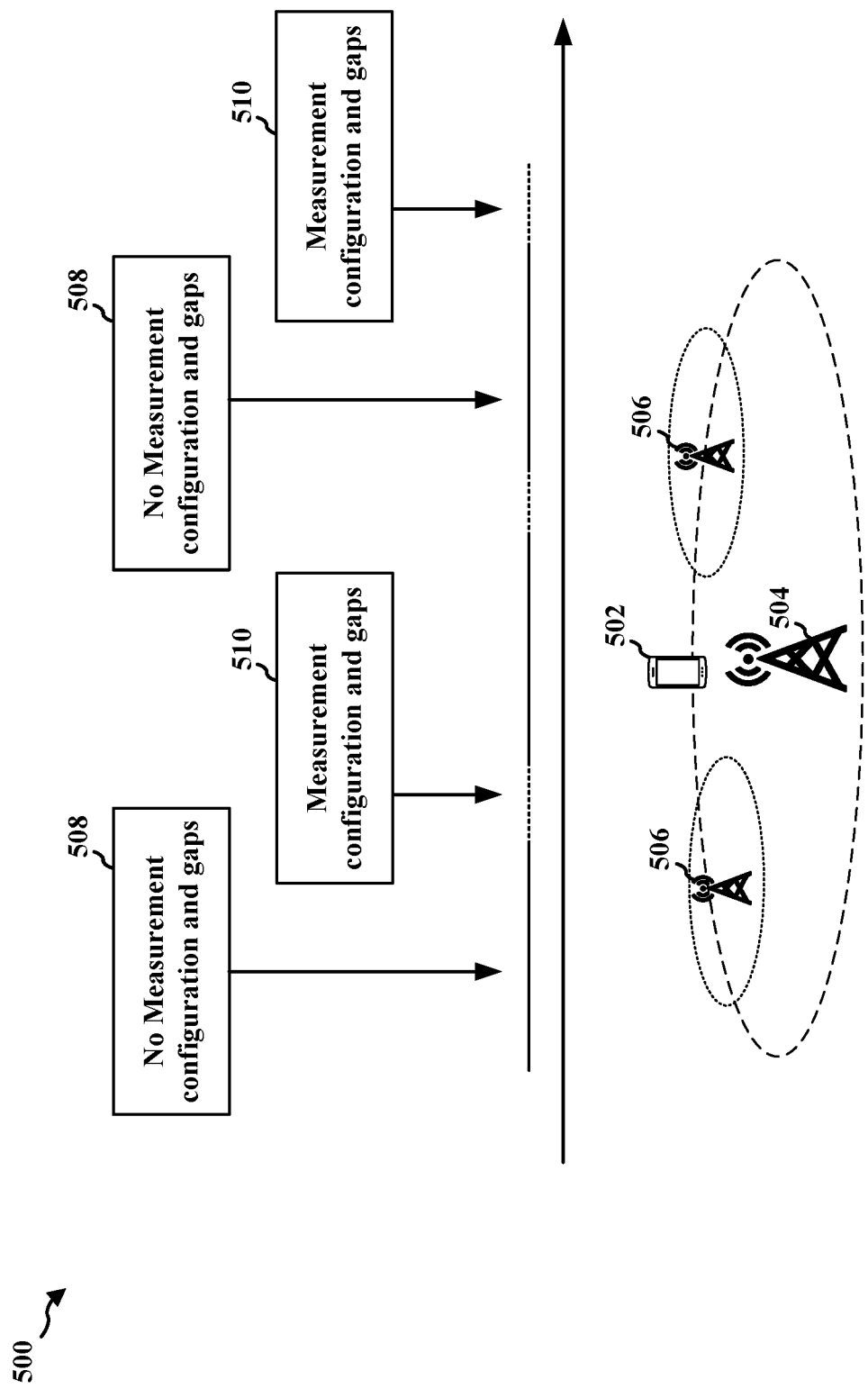
FIG. 5 illustrates a diagram that corresponds to a trial and error technique for a measurement configuration.

FIG. 5 illustrates a diagram 500 that corresponds to a trial and error technique for a measurement configuration. Some 5G non-standalone (NSA) deployments and/or NR dual connectivity (DC) deployments may be associated with unreliable 5G coverage. Thus, millimeter wave (mmW) SCG measurement configuration techniques and/or adding/switching techniques may be used to provide improved the coverage for a UE 502. While the techniques described herein may refer to mmW SCG for exemplary purposes, such techniques are not limited to mmW SCG and may be performed in association with other SCG configurations, such as sub-6 GHz.

An MCG 504 may be used for LTE procedures, whereas an SCG 506 may be used for NR procedures. NR DC procedures may be associated with both the MCG 504 and at least one SCG 506. In some cases, SCG coverage may become unreliable for the UE 502, particularly in association with mmW applications. That is, large areas may be provided where mmW coverage is not measurable by the UE 502.

When the network establishes an MCG connection, the network may be unable to determine whether a location of the UE 502 is within a mmW SCG coverage area. Thus, the network may transmit a measurement configuration to the UE that request the UE to measure the SCG coverage. Each time the network transmits the measurement configuration 510 to the UE 502 for the SCG measurement, the network may configure one or more measurement gaps in association with the measurement configuration 510, where no information is transmitted or received. The one or more measurement gaps may have a negative impact on a battery of the UE 502 and/or an MCG throughput. That is, performing 5G measurements while the UE 502 is in an RRC connected state may reduce LTE procedures and/or MCG throughput.

The UE 502 may perform a search and measurement procedure after the network transmits the measurement configuration 510 to the UE 502. If the UE 502 determines that there is no SCG coverage, the UE 502 may not transmit a measurement report to the network in response to receiving the measurement configuration 510. Thus, if a predetermined amount of time elapses after the network transmits the configuration without receiving a measurement report from the UE 502, the network may release, at 508, the measurement configuration and associated gaps.

The network may be unable to determine an amount of time to wait before attempting to retransmit the measurement configuration 510 to the UE 502. Transmission of the measurement configuration 510 to the UE 502 may be indicative of a request for the UE 502 to measure and report the SCG coverage. Trial and error procedures of the network may include releasing, at 508, a mmW measurement configuration and gap if a mmW measurement report is not received from the UE 502 within n seconds after configuring the mmW measurement and gap to the UE 502. The gap(s) may be of any duration (e.g., 2 seconds, 5 minutes, 10 minutes, etc.). After the network waits for the predetermined amount of time associated with the gap(s) without receiving a measurement report from the UE 502, the network retransmit the mmW measurement configuration and gap. Such trial an error procedures of the network may cause a delay in detecting when the UE 502 enters a mmW coverage area, reductions in LTE or MCG throughput due to the measurement gap(s), and/or an increased power consumption by the UE 502.

Figure 6:
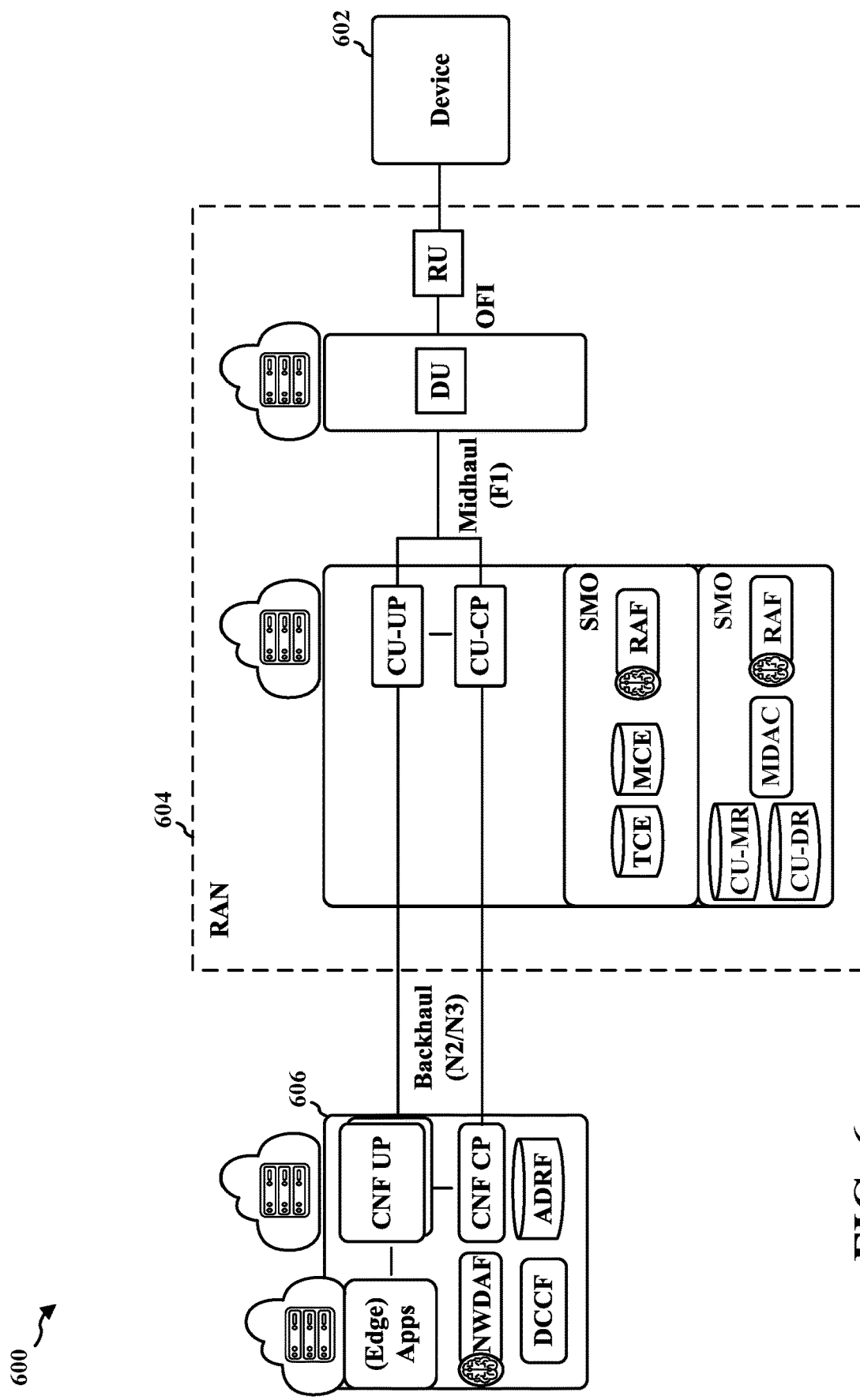
FIG. 6 illustrates a diagram for a radio access network (RAN) analytics function (RAF).

FIG. 6 illustrates a diagram 600 for a RAN analytics function (RAF). Artificial intelligence (AI)/machine learning (ML) devices may be associated with three types of applications. A first application may correspond to AI/ML procedures hosted at a RAN 604 (e.g., centralized unit (CU), distributed unit (DU), radio unit (RU), etc.). In examples, the AI/ML procedures may correspond to data collection procedures. The RAFs may be similar to 3GPP management data analytics services (MDAS) and/or open RAN (O-RAN) non-real time RAN intelligent controller (MC) functions. For example, the RAN 604 may host offline inferences and model training functions.

A second application may correspond to cross-node AI/ML procedures between the RAN 604 and the device 602. Such procedures may enable joint AI/ML techniques between the RAN 604 and the device 602. The cross-node AI/ML procedures may be enabled per device and/or per RAN node to jointly improve AI/ML functions between the device 602 and the RAN 604. A range of AI/ML procedure may be performed including data preparation, training, inferencing, etc.

A third application may provide improved AI/ML device and cloud platform services where, e.g., a cloud/core 606, the RAN 604, and the device 602 may utilize joint AI/ML functions for improved performance. For instance, an application program interface (API) of the device 602 and an API of the cloud/core 606 may operate together to provide improved functionality. Data driven network autonomy may be enabled and scaled based on leveraging virtualization and containerization.

The RAN 604 may be configured to execute AI/ML functions. The functions of the RAN 604 may be allocated between the CU, the DU, and/or the RU. One or more RAFs may be executed to host AI/ML procedures. For example, the one or more RAFs may host offline inference and model training functions for the RAN 604. The one or more RAFs may correspond to a function of a service-based architecture, which may be associated with the MDAS or may be the same as the MDAS. The One or more RAFs may be compatible with a non-real time MC (e.g., associated with an O-RAN).

The one or more RAFs may provide access to RAN data sources associated with a service management orchestration (SMO). For example, the RAN data sources may include a traces collection entity (TCE), a multi-cell/multicast coordination entity (MCE), and data at other RAN entities, such as a CU-control plane (CU-CP), a CU-user plane (CU-UP), the DU, etc. In examples, the entities at the RAN 604 may provide assisting information for the one or more RAFs. In further examples, the SMO may include a CU-data repository (CU-DR), a CU-model repository (CU-MR), a model and data access coordinator (MDAC), etc. The CU-DR may store and retrieve collected data and analytics (e.g., including the TCE and the MCE), the CU-model repository (CU-MR) may store and retrieve models for inference and training by the network, and the MDAC may manage model and data sharing in the RAN.

Figure 7:
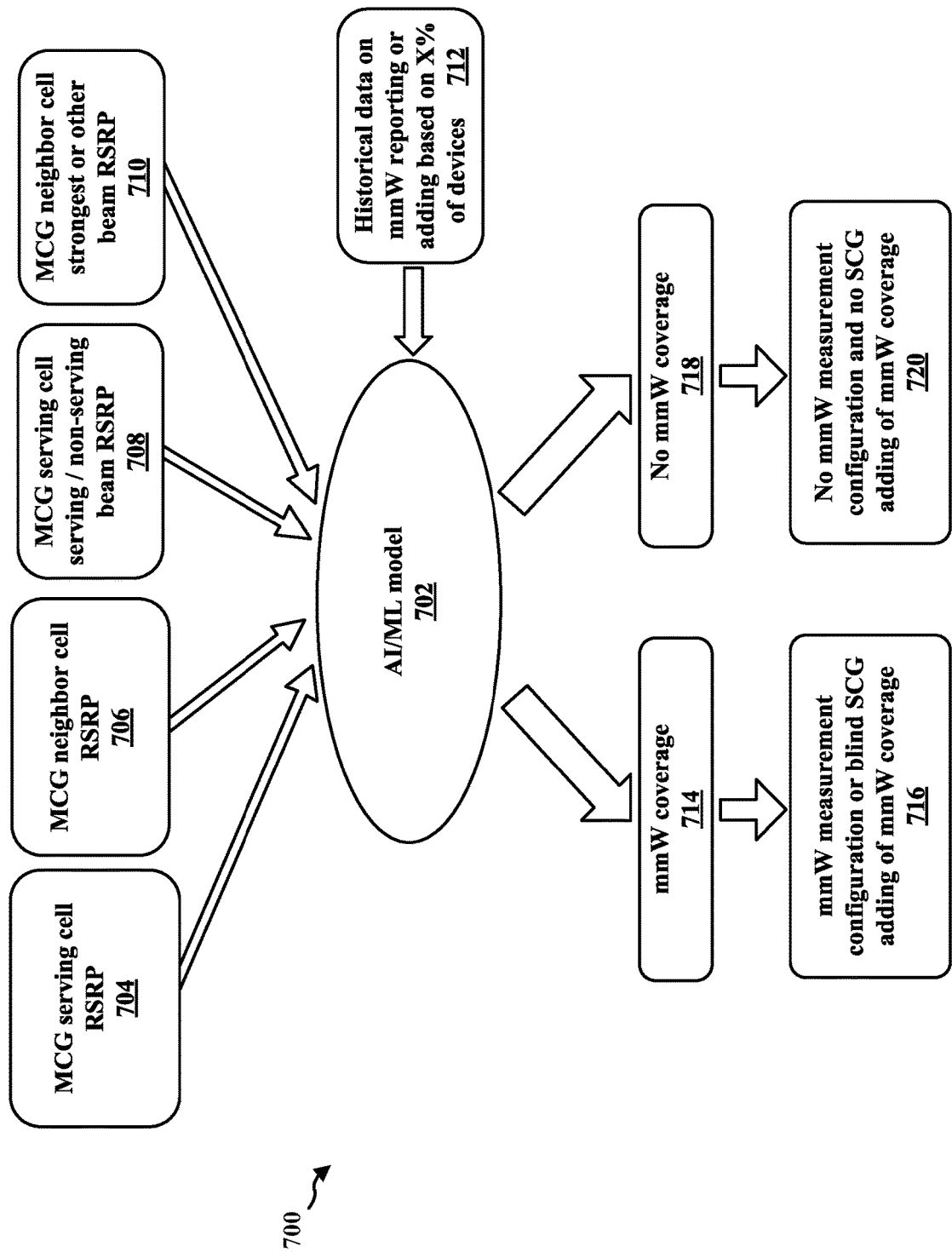
FIG. 7 illustrates a diagram for training an artificial intelligence (AI)/machine learning (ML) model in association with a secondary cell group (SCG) coverage area.

FIG. 7 illustrates a diagram 700 for training an AI/ML model 702 in association with an SCG coverage area. The AI/ML model 702 may be trained based on one or more indications. For example, the one or more indications may correspond to an RSRP of an MCG serving cell (e.g., at 704), an RSRP of an MCG neighbor cell (e.g., at 706), etc. The MCG neighbor cell may be an MCG intra-frequency neighbor cell or an MCG inter-frequency neighbor cell. In NR applications, each cell may utilize multiple beams. Thus, the one or more indications may similarly correspond to an RSRP of a serving beam or a non-serving beam of the MCG serving cell (e.g., at 708), an RSRP of a strongest beam or other beam of the MCG neighbor cell (e.g., at 710), etc.

The RSRP associated with the one or more indications used for training the AI/ML model may be a cell level RSRP (e.g., associated with the MCG serving cell RSRP, at 704, or the MCG neighbor cell RSRP, at 706) or a beam level RSRP (e.g., the serving/non-serving beam RSRP of the MCG serving cell, at 708, or the strongest or other beam RSRP of the MCG neighbor cell, at 710). The one or more indications used for training the AI/ML model 702 may also include reporting of a timing advance (TA) and/or a power head room (PHR). The PHR may correspond to a difference between a maximum allowed UE power and a current UE Tx power.

The AL/ML model 702 may be trained to determine the SCG coverage (e.g., mmW coverage, sub-6 GHz coverage, etc.) based on historical data (e.g., at 712) from one or more UEs. For instance, the historical data, at 712, may correspond to mmW reporting and/or SCG adding/switching instances for a certain percentage of UEs associated with the cell. The network may determine, based on measurements of the one or more UEs included in the certain percentage of UEs and/or the trained AI/ML model, whether a location of a particular UE is within the SCG coverage area. For example, the AI/ML model 702 may indicate whether the UE has mmW coverage. In some cases, the network may refrain from requesting that all of the UEs of the cell measure and report SCG coverage to the network. Instead, the network may configure the certain percentage of UEs associated with the cell (e.g., 10-25% of the UEs associated with the cell) to measure and report the SCG coverage to the network for training the AI/ML model 702. The network may utilize the reported SCG measurements to retune/retrain a previously trained AI/ML model.

Based on the one or more indications, which may include the historical data (e.g., at 712) from the one or more UEs, the AI/ML model 702 may be trained to output a prediction indicative of mmW coverage, at 714, or no mmW coverage, at 718, for the particular UE. While mmW SCG coverage is indicated in the diagram 700 for exemplary purposes, the AI/ML model 702 may be trained to output a predication indicative of other types of coverages, such as sub-6 GHz SCG coverage. If, in the diagram 700, the AI/ML model 702 predicts that the particular UE has the mmW coverage, at 714, the network may transmit, at 716, a measurement configuration (and gaps) for the particular UE or perform, at 716, blind SCG adding of the mmW coverage for the particular UE. Information received by the UE may include a request for the UE to measure and report the mmW coverage to the network. The network may utilize the reported data for further training of the AI/ML model 702. In further aspects, where the AI/ML model 702 predicts that the UE has the mmW coverage, at 714, the AI/ML model 702 may be trained to predict an RSRP value for the mmW coverage, at 714, and/or whether the RSRP value exceeds a threshold, such that the SCG coverage may be added for the UE based on the prediction in order to reduce a latency associated with UE measurement and reporting.

If, in the diagram 700, the AI/ML model 702 predicts that the particular UE has no mmW coverage, at 718, the network may refrain, at 720, from transmitting the measurement configuration (and gaps) for the particular UE and refrain, at 720, from performing the blind SCG adding of the mmW coverage for the particular UE, as such procedures may reduce a battery power of the UE and/or impact the MCG coverage of the UE. If no mmW report is received by the network after the mmW measurement configuration is transmitted by the network based on the output of the AL/ML model 702, the network may perform further training/retraining of the AI/ML model 702. The network may also perform further training/retraining of the AI/ML model 702 in cases where a failure to add the mmW SCG coverage occurs in association with a mmW measurement output via the AI/ML model 702. For example, the network may train/retrain the AI/ML model 702 based on transmitting the measurement configuration to confirm that the UE has no mmW coverage.

In some examples, the AI/ML model 702 may predict that the UE has strong mmW coverage, but after the network transmits the measurement configuration and gap(s), the UE may report based on the transmission that mmW coverage is weaker than the AI/ML model 702 predicted. Thus, the network may determine to further train/retain the AI/ML model 702 based on the report received from the UE. The network may also determine to further train/retrain the AI/ML model 702 based on inaccurate predictions associated with blind SCG adding of the mmW coverage. AI/ML model training may be based on a plurality of iterations/training rounds to increase a prediction accuracy of the AI/ML model 702.

In aspects, the AI/ML model 702 may be included at the UE and may be based on historical data (e.g., at 712) associated with the UE. For example, the AI/ML model 702 may be configured to the UE from the RAN or the UE may perform the training of the AI/ML model 702 included at the UE (e.g., based on a UE capability). The AI/ML model 702 included at the UE may predict whether the UE has SCG coverage (e.g., based on an MCG measurement). If the network configures the AI/ML model 702 to the UE, the UE may utilize the MCG measurement performed at the UE to predict the SCG coverage. The UE may utilize a MAC-control element (MAC-CE) or RRC signaling to transmit AI/ML model information to the network. For example, the UE may indicate to the network whether the network should configure the UE for the SCG coverage.

If the UE uses the MCG measurement performed by the UE to predict the SCG coverage for a location of the UE, an accuracy/confidence level may be associated with the prediction (e.g., 50% confidence, 95% confidence, etc.). The RAN may weight the accuracy/confidence level of the prediction from the UE with a second accuracy/confidence level determined at the RAN. In an example, the RAN may predict that the mmW RSRP is equal to −90 dBM, whereas the UE may predict that mmW RSRP is equal to −80 dBM. In a first configuration, the RAN may perform equal weighting of the predictions, e.g., (−90 dBM*0.5)+(−80 dBM*0.5)=−85 dBM. In a second configuration, where the UE includes increased capabilities, the RAN may provide more weight to the prediction of the UE, e.g., (−90 dBM*0.2)+(−80 dBM*0.8)=−82 dBM. In a third configuration, where the UE includes decreased capabilities, the RAN may provide more weight to the prediction of the RAN, e.g., (−90 dBM*0.8)+(−80 dBM*0.2)=−88 dBM.

Each AI/ML model 702 may also be assigned an accuracy/confidence level (e.g., model 0 may be assigned a higher accuracy/confidence level than model 1). UE-side predictions may be based on a single device, whereas RAN-side predictions may be based on a plurality of devices (e.g., 20 or more UEs) with different UE capabilities and/or measurement accuracies. For example, RAN-side predictions may be based on information received from 0.01% of UEs having a high level of accuracy, 1% of UEs having a low level of accuracy, etc. The aspects described herein may allow the network to configure or not configure SCG measurements and/or to add or not add SCG capabilities based on an output of the AL/ML model 702 to reduce or avoid trial and error techniques associated with SCG coverage determinations. Such aspects may reduce SCG adding latency, reduce or avoid SCG measurement configurations with gaps that reduce MCG throughput, and conserve a battery power of the UE based on avoiding excessive SCG search and measurement procedures.

Figure 8:
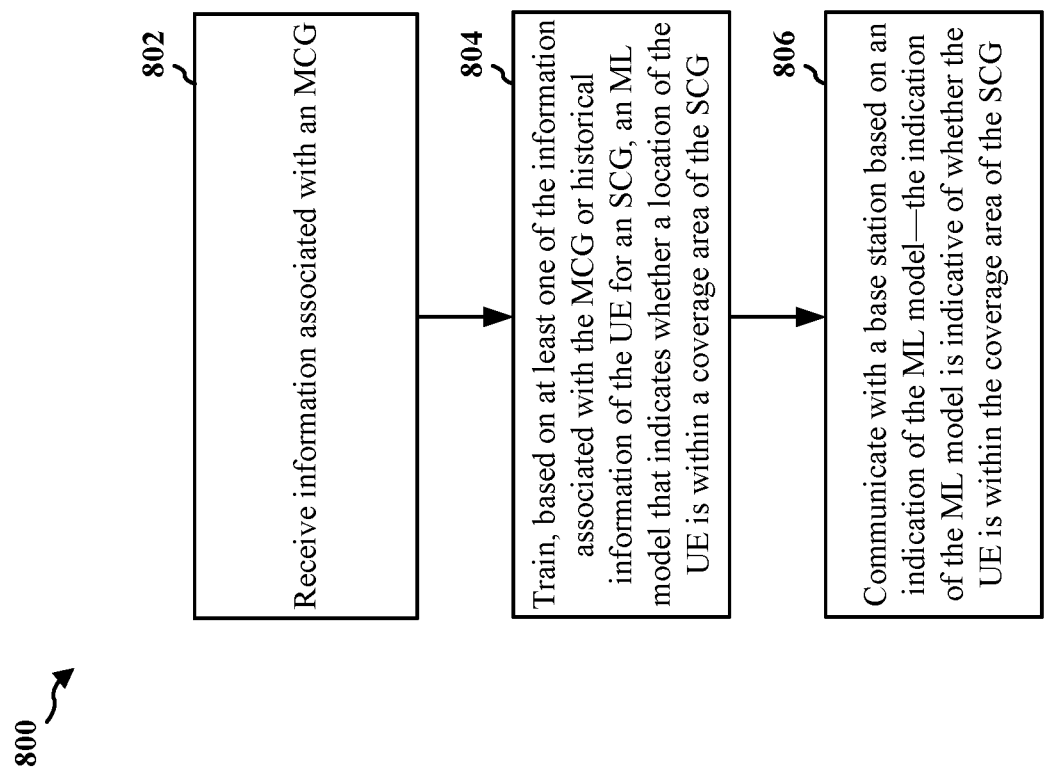
FIG. 8 is a flowchart of a method of wireless communication at a UE.

FIG. 8 is a flowchart 800 of a method of wireless communication. The method may be performed by a UE (e.g., the UE 104, 402; the apparatus 1202; etc.), which may include the memory 360 and which may be the entire UE 104, 402 or a component of the UE 104, 402, such as the TX processor 368, the RX processor 356, and/or the controller/processor 359.

At 802, the UE may receive information associated with an MCG. For example, referring to FIGS. 4 and 7, the UE 402 may receive, at 406*a*, MCG information. In the diagram 700, the AI/ML model 702 may be trained based on one or more indications received in association with an RSRP of the MCG serving (e.g., at 704), the MCG neighbor cell (e.g., at 706), the serving/non-serving beam of the MCG serving cell (e.g., at 708), and/or the strongest or other beam of the MCG neighbor cell (e.g., at 710). The reception, at 802, may be performed by the reception component 1230 of the apparatus 1202 in FIG. 12.

At 804, the UE may train, based on at least one of the information associated with the MCG or historical information of the UE for an SCG, an ML model that indicates whether a location of the UE is within a coverage area of the SCG. For example, referring to FIGS. 4 and 7, the UE 402 may train, at 408*a*, an ML model to indicate whether a location of the UE 402 is within SCG coverage. The training, at 408*a*, may be based on the MCG information received, at 406*a*. In the diagram 700, the AI/ML model 702 may be trained based on the one or more indications, which may include any of the indications, at 704-710, and/or the historical data, at 712. The training, at 804, may be performed by the training component 1240 of the apparatus 1202 in FIG. 12.

At 806, the UE may communicate with a base station based on an indication of the ML model—the indication of the ML model is indicative of whether the UE is within the coverage area of the SCG. For example, referring to FIGS. 4 and 7, the UE 402 may communicate, at 414, with the base station 404 based on the SCG coverage indication, at 410*c*. In the diagram 700, an output of the AI/ML model may predict whether the UE has mmW coverage, at 714, or no mmW coverage, at 718. The communication, at 806, may be performed by the communication component 1242 of the apparatus 1202 in FIG. 12.

Figure 9:
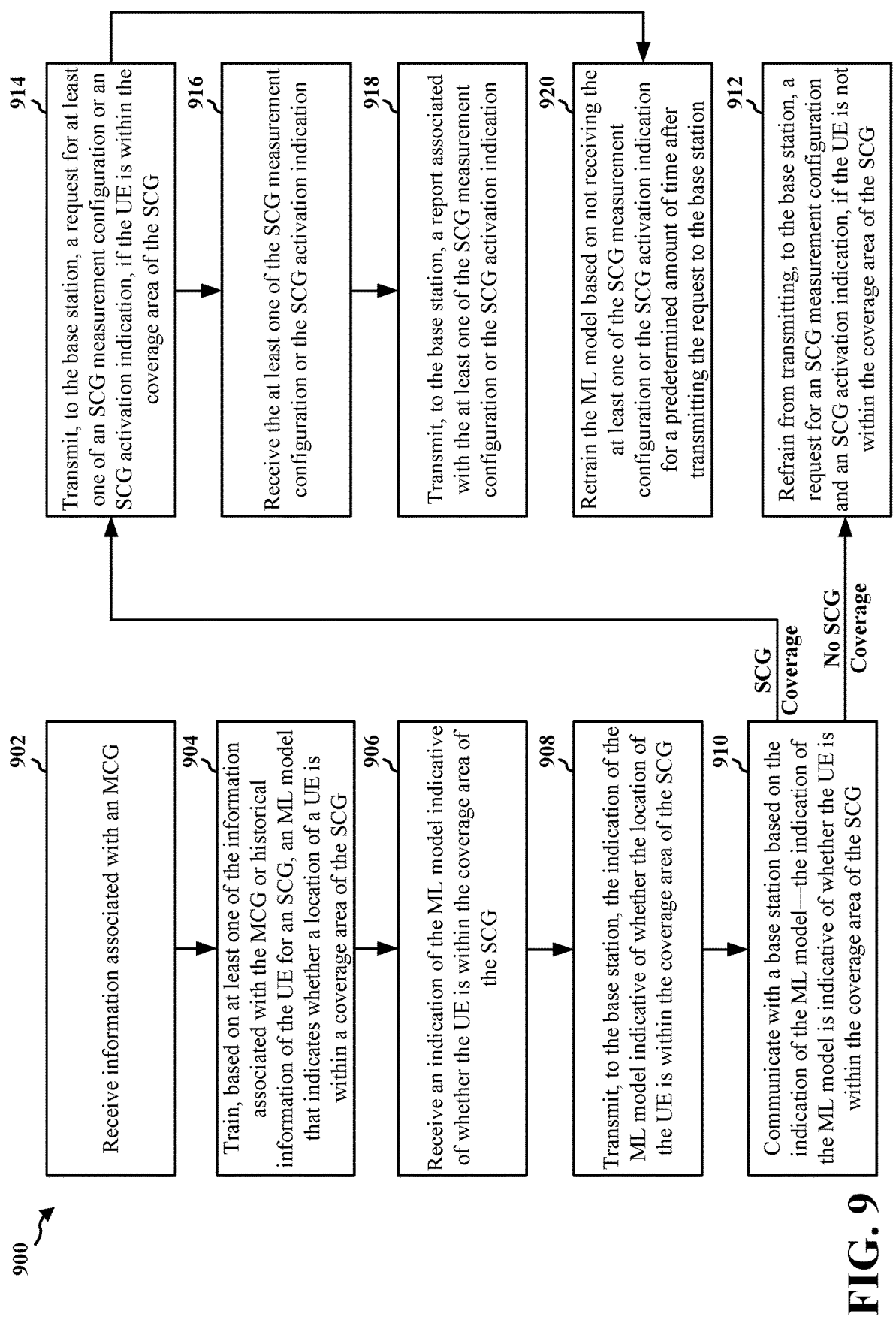
FIG. 9 is a flowchart of a method of wireless communication at a UE.

FIG. 9 is a flowchart 900 of a method of wireless communication. The method may be performed by a UE (e.g., the UE 104, 402; the apparatus 1202; etc.), which may include the memory 360 and which may be the entire UE 104, 402 or a component of the UE 104, 402, such as the TX processor 368, the RX processor 356, and/or the controller/processor 359.

At 902, the UE may receive information associated with an MCG. For example, referring to FIGS. 4 and 7, the UE 402 may receive, at 406a, MCG information. In the diagram 700, the AI/ML model 702 may be trained based on one or more indications received in association with an RSRP of the MCG serving (e.g., at 704), the MCG neighbor cell (e.g., at 706), the serving/non-serving beam of the MCG serving cell (e.g., at 708), and/or the strongest or other beam of the MCG neighbor cell (e.g., at 710). The information associated with the MCG may be indicative of at least one of the RSRP (e.g., at 704-710), a TA, a PHR, or CSI. The MCG may correspond to at least one of an MCG serving cell (e.g., at 704 and 708) or an MCG neighbor cell (e.g., at 706 and 710). The at least one of the RSRP, the TA, the PHR, or the CSI may correspond to at least one of a serving beam of the MCG serving cell (e.g., at 708), a non-serving beam of the MCG serving cell (e.g., at 708), a strongest beam of the MCG neighbor cell (e.g., at 710), or a non-strongest beam of the MCG neighbor cell (e.g., at 710). The reception, at 902, may be performed by the reception component 1230 of the apparatus 1202 in FIG. 12.

At 904, the UE may train, based on at least one of the information associated with the MCG or historical information of the UE for an SCG, an ML model that indicates whether a location of a UE is within a coverage area of the SCG. For example, referring to FIGS. 4 and 7, the UE 402 may train, at 408a, an ML model to indicate whether a location of the UE 402 is within SCG coverage. The training, at 408a, may be based on the MCG information received, at 406a. In the diagram 700, the AI/ML model 702 may be trained based on the one or more indications, which may include any of the indications, at 704-710, and/or the historical data, at 712. The training, at 904, may be performed by the training component 1240 of the apparatus 1202 in FIG. 12.

At 906, the UE may receive an indication of the ML model indicative of whether the UE is within the coverage area of the SCG. For example, referring to FIG. 4, the UE 402 may receive, at 410a, an SCG coverage indication. The reception, at 906, may be performed by the reception component 1230 of the apparatus 1202 in FIG. 12.

At 908, the UE may transmit, to the base station, the indication of the ML model indicative of whether the location of the UE is within the coverage area of the SCG. For example, referring to FIG. 4, the UE 402 may transmit, at 410c, an SCG coverage indication to the base station 404 (e.g., based on the SCG coverage indication received, at 410a, from the trained ML model). The indication of the ML model (e.g., associated with 410a and 410c) may be based on at least one of the ML model being trained at the UE 402 or the ML model being configured to the UE 402 from the base station 404. The indication of the ML model (e.g., associated with 410a and 410c) may be associated with a first level of confidence for being weighted with a second indication (e.g., associated with 410b) of a second ML model at the base station 404 associated with a second level of confidence. Communication with the base station 404 may be based on a weighted level of confidence for whether the UE 402 is within the coverage area of the SCG. A weight for the indication of the ML model (e.g., associated with 410a and 410c) may be further based on a capability of the UE 402. The indication, at 410a, of the ML model indicative of whether the UE 402 is within the coverage area of the SCG may be based on a second indication, at 410b, of a second ML model associated with the base station 404. The transmission, at 908, may be performed by the transmission component 1234 of the apparatus 1202 in FIG. 12.

At 910, the UE may communicate with a base station based on the indication of the ML model—the indication of the ML model is indicative of whether the UE is within the coverage area of the SCG. For example, referring to FIGS. 4 and 7, the UE 402 may communicate, at 414, with the base station 404 based on the SCG coverage indication, at 410c. In the diagram 700, an output of the AI/ML model may predict whether the UE has mmW coverage, at 714, or no mmW coverage, at 718. The communication, at 910, may be performed by the communication component 1242 of the apparatus 1202 in FIG. 12.

At 912, the UE may refrain from transmitting, to the base station, a request for an SCG measurement configuration and an SCG activation indication, if the UE is not within the coverage area of the SCG. For example, referring to FIGS. 4 and 7, communicating, at 414, with the base station 404 may include refraining, at 418 and 720, from transmitting, to the base station 404, a request for an SCG measurement configuration and an SCG activation indication, if the UE 402 is not within the coverage area (e.g., at 416a and 718) of the SCG. The refraining, at 912, may be performed by the refrainer component 1244 of the apparatus 1202 in FIG. 12.

At 914, the UE may transmit, to the base station, a request for at least one of an SCG measurement configuration or an SCG activation indication, if the UE is within the coverage area of the SCG. For example, referring to FIGS. 4 and 7, communicating, at 414, with the base station 404 may include transmitting, at 420 and 716, to the base station 404, a request for an SCG measurement configuration/activation indication, if the UE 402 is within the coverage area (e.g., at 416a and 714) of the SCG. The transmission, at 914, may be performed by the transmission component 1234 of the apparatus 1202 in FIG. 12.

At 916, the UE may receive the at least one of the SCG measurement configuration or the SCG activation indication. For example, referring to FIG. 4, the UE 402 may receive, at 420, an SCG measurement configuration/activation from the base station 404. The reception, at 916, may be performed by the reception component 1230 of the apparatus 1202 in FIG. 12.

At 918, the UE may transmit, to the base station, a report associated with the at least one of the SCG measurement configuration or the SCG activation indication. For example, referring to FIG. 4, the UE 402 may transmit, at 422, an SCG measurement configuration/activation report to the base station 404. The transmission, at 918, may be performed by the transmission component 1234 of the apparatus 1202 in FIG. 12.

At 920, the UE may retrain the ML model based on not receiving the at least one of the SCG measurement configuration or the SCG activation indication for a predetermined amount of time after transmitting the request to the base station. For example, referring to FIG. 4, the UE 402 may retrain, at 424, the ML model if the SCG measurement configuration/activation is not received in response to the transmitted report (e.g., the SCG measurement configuration/activation report transmitted, at 422, to the base station 404). The retraining, at 920, may be performed by the retraining component 1246 of the apparatus 1202 in FIG. 12.

Figure 10:
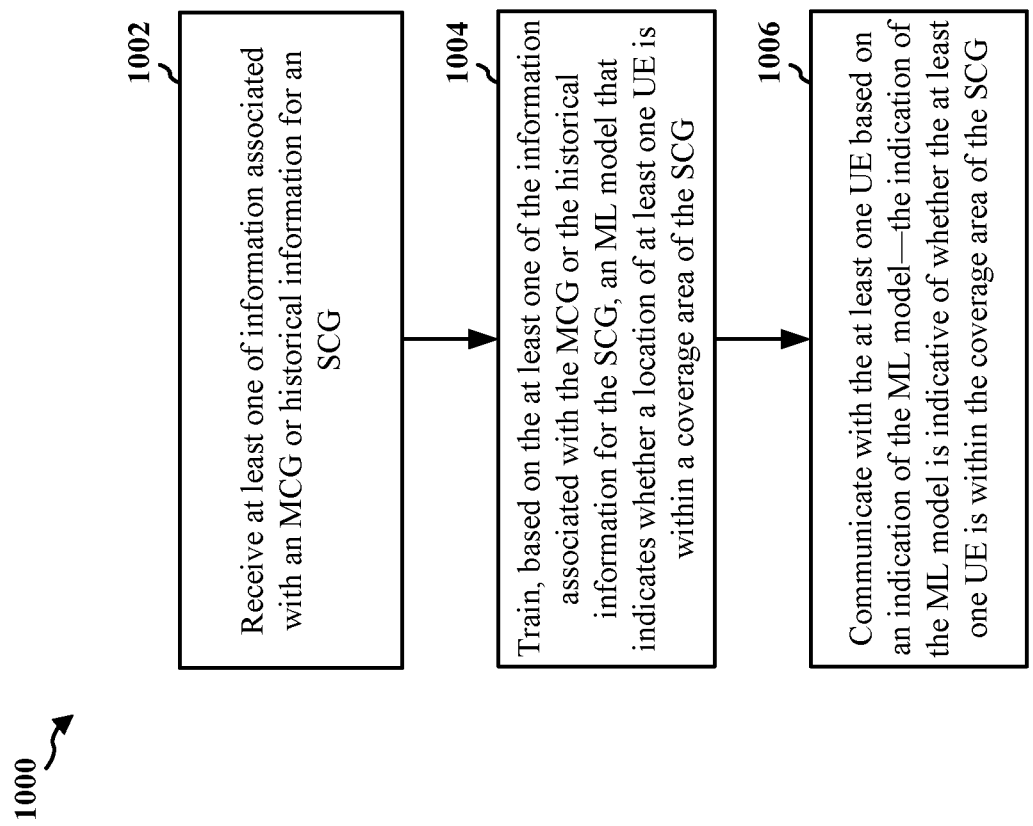
FIG. 10 is a flowchart of a method of wireless communication at a base station.

FIG. 10 is a flowchart 1000 of a method of wireless communication. The method may be performed by a base station (e.g., the base station 102, 404; the apparatus 1302; etc.), which may include the memory 376 and which may be the entire base station 102, 404 or a component of the base station 102, 404, such as the TX processor 316, the RX processor 370, and/or the controller/processor 375.

At 1002, the base station may receive at least one of information associated with an MCG or historical information for an SCG. For example, referring to FIGS. 4 and 7, the base station 404 may receive, at 406b, MCG information and/or SCG historical information. In the diagram 700, the AI/ML model 702 may be trained based on one or more indications received in association with the historical data (e.g., at 712) and/or an RSRP of the MCG serving (e.g., at 704), the MCG neighbor cell (e.g., at 706), the serving/non-serving beam of the MCG serving cell (e.g., at 708), and/or the strongest or other beam of the MCG neighbor cell (e.g., at 710). The reception, at 1002, may be performed by the reception component 1330 of the apparatus 1302 in FIG. 13.

At 1004, the base station may train, based on the at least one of the information associated with the MCG or the historical information for the SCG, an ML model that indicates whether a location of at least one UE is within a coverage area of the SCG. For example, referring to FIGS. 4 and 7, the base station 404 may train, at 408b, an ML model to indicate whether a location of the UE 402 is within SCG coverage. The training, at 408b, may be based on the MCG information and/or the SCG historical information received, at 406b. In the diagram 700, the AI/ML model 702 may be trained based on the one or more indications, which may include any of the indications, at 704-710, and/or the historical data, at 712. The training, at 1004, may be performed by the training component 1340 of the apparatus 1302 in FIG. 13.

At 1006, the base station may communicate with the at least one UE based on an indication of the ML model—the indication of the ML model is indicative of whether the at least one UE is within the coverage area of the SCG. For example, referring to FIG. 4, the base station 404 may communicate, at 414, with the UE 402 based on the SCG coverage indication, at 410c. In the diagram 700, an output of the AI/ML model may predict whether the UE has mmW coverage, at 714, or no mmW coverage, at 718. The communication, at 1006, may be performed by the communication component 1344 of the apparatus 1302 in FIG. 13.

Figure 11:
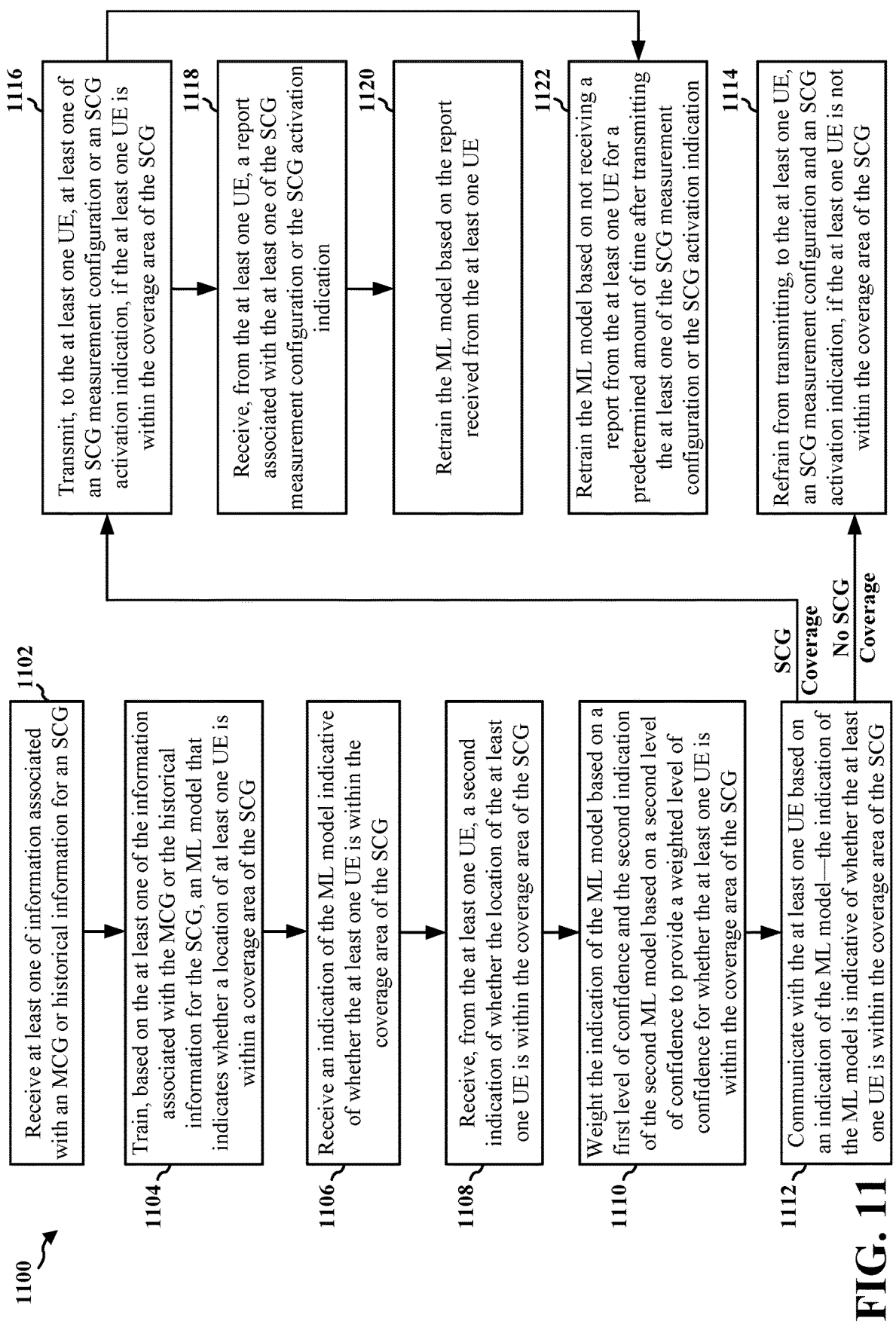
FIG. 11 is a flowchart of a method of wireless communication at a base station.

FIG. 11 is a flowchart 1100 of a method of wireless communication. The method may be performed by a base station (e.g., the base station 102, 404; the apparatus 1302; etc.), which may include the memory 376 and which may be the entire base station 102, 404 or a component of the base station 102, 404, such as the TX processor 316, the RX processor 370, and/or the controller/processor 375.

At 1102, the base station may receive at least one of information associated with an MCG or historical information for an SCG. For example, referring to FIGS. 4 and 7, the base station 404 may receive, at 406b, MCG information and/or SCG historical information. In the diagram 700, the AI/ML model 702 may be trained based on one or more indications received in association with the historical data (e.g., at 712) and/or an RSRP of the MCG serving (e.g., at 704), the MCG neighbor cell (e.g., at 706), the serving/non-serving beam of the MCG serving cell (e.g., at 708), and/or the strongest or other beam of the MCG neighbor cell (e.g., at 710). The information associated with the MCG may be indicative of at least one of the RSRP (e.g., at 704-710), a TA, a PHR, or CSI. The MCG may correspond to at least one of an MCG serving cell (e.g., at 704 and 708) or an MCG neighbor cell (e.g., at 706 and 710). The at least one of the RSRP, the TA, the PHR, or the CSI may correspond to at least one of a serving beam of the MCG serving cell (e.g., at 708), a non-serving beam of the MCG serving cell (e.g., at 708), a strongest beam of the MCG neighbor cell (e.g., at 710), or a non-strongest beam of the MCG neighbor cell (e.g., at 710). The reception, at 1102, may be performed by the reception component 1330 of the apparatus 1302 in FIG. 13.

At 1104, the base station may train, based on the at least one of the information associated with the MCG or the historical information for the SCG, an ML model that indicates whether a location of at least one UE is within a coverage area of the SCG. For example, referring to FIGS. 4 and 7, the base station 404 may train, at 408b, an ML model to indicate whether a location of the UE 402 is within SCG coverage. The training, at 408b, may be based on the MCG information and/or the SCG historical information received, at 406b. In the diagram 700, the AI/ML model 702 may be trained based on the one or more indications, which may include any of the indications, at 704-710, and/or the historical data, at 712. The training, at 1104, may be performed by the training component 1340 of the apparatus 1302 in FIG. 13.

At 1106, the base station may receive an indication of the ML model indicative of whether the at least one UE is within the coverage area of the SCG. For example, referring to FIG. 4, the base station 404 may receive, at 410b, an SCG coverage indication. The reception, at 1106, may be performed by the reception component 1330 of the apparatus 1302 in FIG. 13.

At 1108, the base station may receive, from the at least one UE, a second indication of whether the location of the at least one UE is within the coverage area of the SCG. For example, referring to FIG. 4, the base station 404 may receive, at 410c, an SCG coverage indication from the UE 402. The second indication, at 410c, (e.g., associated with the first indication at 410b), may be based on at least one of the ML model being configured to the at least one UE 402 or a second ML model that is trained at the at least one UE 402. The reception, at 1108, may be performed by the reception component 1330 of the apparatus 1302 in FIG. 13.

At 1110, the base station may weight the indication of the ML model based on a first level of confidence and the second indication of the second ML model based on a second level of confidence to provide a weighted level of confidence for whether the at least one UE is within the coverage area of the SCG. For example, referring to FIG. 4, the base station 404 may weight, at 412, the SCG coverage indications, at 410b-410c, to determine an SCG coverage confidence level. The indication, at 410b, of the ML model may be associated with a first level of confidence and the second indication, at 410c, of the second ML model may be associated with a second level of confidence. A weight for the second indication, at 410c, of the second ML model may be further based on a capability of the UE 402. The indication, at 410a, of the ML model indicative of whether the UE 402 is within the coverage area of the SCG may be based on a second indication, at 410b, of a second ML model associated with the base station 404. The weighting, at 1110, may be performed by the weight component 1342 of the apparatus 1302 in FIG. 13.

At 1112, the base station may communicate with the at least one UE based on an indication of the ML model—the indication of the ML model is indicative of whether the at least one UE is within the coverage area of the SCG. For example, referring to FIG. 4, the base station 404 may communicate, at 414, with the UE 402 based on the SCG coverage indication, at 410c. In the diagram 700, an output of the AI/ML model may predict whether the UE has mmW coverage, at 714, or no mmW coverage, at 718. The communication, at 1112, may be performed by the communication component 1344 of the apparatus 1302 in FIG. 13.

At 1114, the base station may refrain from transmitting, to the at least one UE, an SCG measurement configuration and an SCG activation indication, if the at least one UE is not within the coverage area of the SCG. For example, referring to FIGS. 4 and 7, communicating, at 414, with the UE 402 may include refraining, at 418 and 720, from transmitting, to the UE 402, a request for an SCG measurement configuration and an SCG activation indication, if the UE 402 is not within the coverage area (e.g., at 416b and 718) of the SCG. The refraining, at 1114, may be performed by the refrainer component 1346 of the apparatus 1302 in FIG. 13.

At 1116, the base station may transmit, to the at least one UE, at least one of an SCG measurement configuration or an SCG activation indication, if the at least one UE is within the coverage area of the SCG. For example, referring to FIGS. 4 and 7, communicating, at 414, with the UE 402 may include transmitting, at 420 and 716, to the UE 402, a request for an SCG measurement configuration/activation indication, if the UE 402 is within the coverage area (e.g., at 416b and 714) of the SCG. The transmission, at 1116, may be performed by the transmission component 1334 of the apparatus 1302 in FIG. 13.

At 1118, the base station may receive, from the at least one UE, a report associated with the at least one of the SCG measurement configuration or the SCG activation indication. For example, referring to FIG. 4, the base station 404 may receive, at 422, an SCG measurement configuration/activation report from the UE 402. The reception, at 1118, may be performed by the reception component 1330 of the apparatus 1302 in FIG. 13.

At 1120, the base station may retrain the ML model based on the report received from the at least one UE. For example, referring to FIG. 4, the base station 404 may retrain, at 426(1), the ML model based on the received report (e.g., the SCG measurement configuration/activation report received, at 422, from the UE 402). The retraining, at 1120, may be performed by the retraining component 1348 of the apparatus 1302 in FIG. 13.

At 1122, the base station may retrain the ML model based on not receiving a report from the at least one UE for a predetermined amount of time after transmitting the at least one of the SCG measurement configuration or the SCG activation indication. For example, referring to FIG. 4, the base station 404 may retrain, at 426(2), the ML model based on not receiving the report for a certain amount of time after transmitting the SCG measurement configuration/activation, at 420, to the UE 402. The retraining, at 1122, may be performed by the retraining component 1348 of the apparatus 1302 in FIG. 13.

Figure 12:
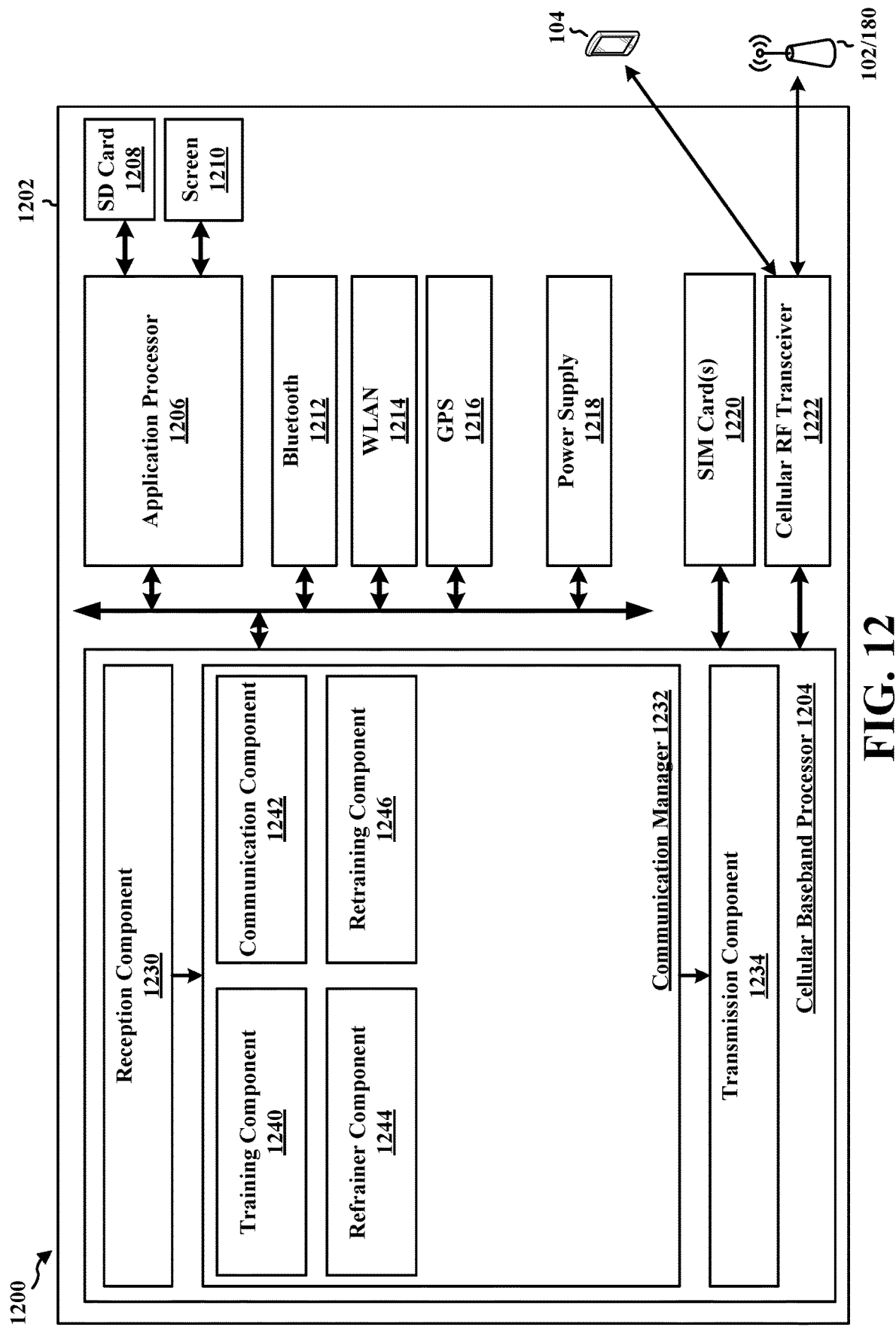
FIG. 12 is a diagram illustrating an example of a hardware implementation for an example apparatus.

FIG. 12 is a diagram 1200 illustrating an example of a hardware implementation for an apparatus 1202. The apparatus 1202 may be a UE, a component of a UE, or may implement UE functionality. In some aspects, the apparatus 1202 may include a cellular baseband processor 1204 (also referred to as a modem) coupled to a cellular RF transceiver 1222. In some aspects, the apparatus 1202 may further include one or more subscriber identity modules (SIM) cards 1220, an application processor 1206 coupled to a secure digital (SD) card 1208 and a screen 1210, a Bluetooth™ module 1212, a wireless local area network (WLAN) module 1214, a Global Positioning System (GPS) module 1216, or a power supply 1218. The cellular baseband processor 1204 communicates through the cellular RF transceiver 1222 with the UE 104 and/or BS 102/180. The cellular baseband processor 1204 may include a computer-readable medium/memory. The computer-readable medium/memory may be non-transitory. The cellular baseband processor 1204 is responsible for general processing, including the execution of software stored on the computer-readable medium/memory. The software, when executed by the cellular baseband processor 1204, causes the cellular baseband processor 1204 to perform the various functions described supra. The computer-readable medium/memory may also be used for storing data that is manipulated by the cellular baseband processor 1204 when executing software. The cellular baseband processor 1204 further includes a reception component 1230, a communication manager 1232, and a transmission component 1234. The communication manager 1232 includes the one or more illustrated components. The components within the communication manager 1232 may be stored in the computer-readable medium/memory and/or configured as hardware within the cellular baseband processor 1204. The cellular baseband processor 1204 may be a component of the UE 350 and may include the memory 360 and/or at least one of the TX processor 368, the RX processor 356, and the controller/processor 359. In one configuration, the apparatus 1202 may be a modem chip and include just the baseband processor 1204, and in another configuration, the apparatus 1202 may be the entire UE (e.g., see 350 of FIG. 3) and include the additional modules of the apparatus 1202.

The communication manager 1232 includes a training component 1240 that is configured, e.g., as described in connection with 804 and 904, to train, based on at least one of the information associated with the MCG or historical information of the UE for an SCG, an ML model that indicates whether a location of a UE is within a coverage area of the SCG. The communication manager 1232 further includes a communication component 1242 that is configured, e.g., as described in connection with 806 and 910, to communicate with a base station based on the indication of the ML model—the indication of the ML model is indicative of whether the UE is within the coverage area of the SCG. The communication manager 1232 further includes a refrainer component 1244 that is configured, e.g., as described in connection with 912, to refrain from transmitting, to the base station, a request for an SCG measurement configuration and an SCG activation indication, if the UE is not within the coverage area of the SCG. The communication manager 1232 further includes a retraining component 1246 that is configured, e.g., as described in connection with 920, to retrain the ML model based on not receiving the at least one of the SCG measurement configuration or the SCG activation indication for a predetermined amount of time after transmitting the request to the base station.

The reception component 1230 is configured, e.g., as described in connection with 802, 902, 906, and 916, to receive information associated with an MCG; to receive an indication of the ML model indicative of whether the UE is within the coverage area of the SCG; and to receive the at least one of the SCG measurement configuration or the SCG activation indication. The transmission component 1234 is configured, e.g., as described in connection with 908, 914, and 918, to transmit, to the base station, the indication of the ML model indicative of whether the location of the UE is within the coverage area of the SCG; to transmit, to the base station, a request for at least one of an SCG measurement configuration or an SCG activation indication, if the UE is within the coverage area of the SCG; and to transmit, to the base station, a report associated with the at least one of the SCG measurement configuration or the SCG activation indication.

The apparatus may include additional components that perform each of the blocks of the algorithm in the flowcharts of FIGS. 8-9. As such, each block in the flowcharts of FIGS. 8-9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1202 may include a variety of components configured for various functions. In one configuration, the apparatus 1202, and in particular the cellular baseband processor 1204, includes means for receiving information associated with an MCG; training, based on at least one of the information associated with the MCG or historical information of the UE for an SCG, an ML model that indicates whether a location of the UE is within a coverage area of the SCG; and communicating with a base station based on an indication of the ML model, the indication of the ML model indicative of whether the UE is within the coverage area of the SCG. The apparatus 1202 further includes means for receiving the indication of the ML model indicative of whether the UE is within the coverage area of the SCG. The means for communicating with the base station are further configured to refrain from transmitting, to the base station, a request for an SCG measurement configuration and an SCG activation indication, if the UE is not within the coverage area of the SCG. The means for communicating with the base station are further configured to transmit, to the base station, a request for at least one of an SCG measurement configuration or an SCG activation indication, if the UE is within the coverage area of the SCG. The apparatus 1202 further includes means for receiving the at least one of the SCG measurement configuration or the SCG activation indication; and transmitting, to the base station, a report associated with the at least one of the SCG measurement configuration or the SCG activation indication. The apparatus 1202 further includes means for retraining the ML model based on not receiving the at least one of the SCG measurement configuration or the SCG activation indication for a predetermined amount of time after transmitting, to the base station, the request for the at least one of the SCG measurement configuration or the SCG activation indication. The apparatus 1202 further includes means for transmitting, to the base station, the indication of the ML model indicative of whether the location of the UE is within the coverage area of the SCG.

The means may be one or more of the components of the apparatus 1202 configured to perform the functions recited by the means. As described supra, the apparatus 1202 may include the TX Processor 368, the RX Processor 356, and the controller/processor 359. As such, in one configuration, the means may be the TX Processor 368, the RX Processor 356, and the controller/processor 359 configured to perform the functions recited by the means.

Figure 13:
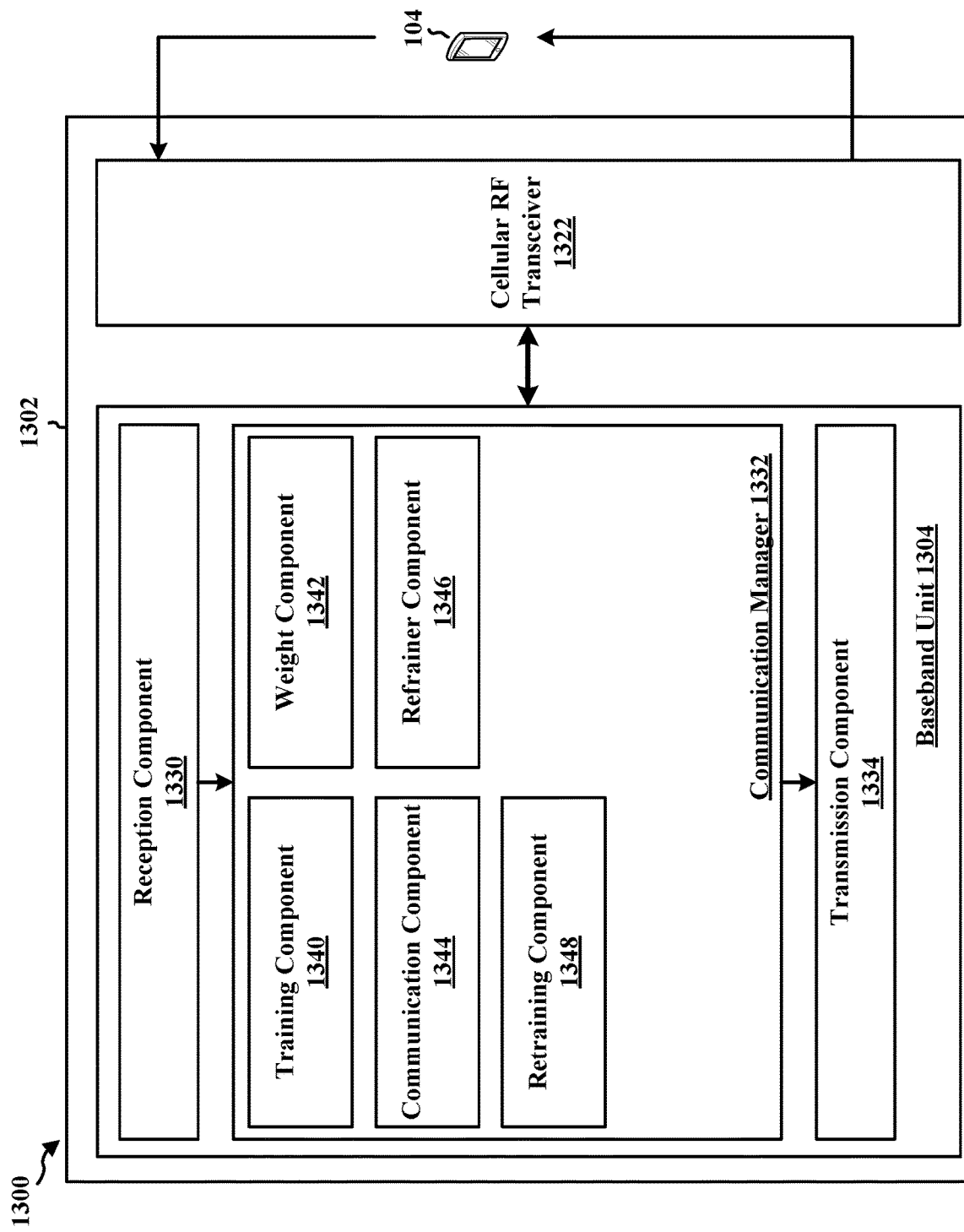
FIG. 13 is a diagram illustrating an example of a hardware implementation for an example apparatus.

FIG. 13 is a diagram 1300 illustrating an example of a hardware implementation for an apparatus 1302. The apparatus 1302 may be a base station, a component of a base station, or may implement base station functionality. In some aspects, the apparatus 1202 may include a baseband unit 1304. The baseband unit 1304 may communicate through a cellular RF transceiver 1322 with the UE 104. The baseband unit 1304 may include a computer-readable medium/memory. The baseband unit 1304 is responsible for general processing, including the execution of software stored on the computer-readable medium/memory. The software, when executed by the baseband unit 1304, causes the baseband unit 1304 to perform the various functions described supra. The computer-readable medium/memory may also be used for storing data that is manipulated by the baseband unit 1304 when executing software. The baseband unit 1304 further includes a reception component 1330, a communication manager 1332, and a transmission component 1334. The communication manager 1332 includes the one or more illustrated components. The components within the communication manager 1332 may be stored in the computer-readable medium/memory and/or configured as hardware within the baseband unit 1304. The baseband unit 1304 may be a component of the base station 310 and may include the memory 376 and/or at least one of the TX processor 316, the RX processor 370, and the controller/processor 375.

The communication manager 1332 includes a training component 1340 that is configured, e.g., as described in connection with 1004 and 1104, to train, based on the at least one of the information associated with the MCG or the historical information for the SCG, an ML model that indicates whether a location of at least one UE is within a coverage area of the SCG. The communication manager 1332 further includes a weight component 1342 that is configured, e.g., as described in connection with 1110, to weight the indication of the ML model based on a first level of confidence and the second indication of the second ML model based on a second level of confidence to provide a weighted level of confidence for whether the at least one UE is within the coverage area of the SCG. The communication manager 1332 further includes a communication component 1344 that is configured, e.g., as described in connection with 1006 and 1112, to communicate with the at least one UE based on an indication of the ML model—the indication of the ML model is indicative of whether the at least one UE is within the coverage area of the SCG. The communication manager 1332 further includes a refrainer component 1346 that is configured, e.g., as described in connection with 1114, to refrain from transmitting, to the at least one UE, an SCG measurement configuration and an SCG activation indication, if the at least one UE is not within the coverage area of the SCG. The communication manager 1332 further includes a retraining component 1348 that is configured, e.g., as described in connection with 1120 and 1122, to retrain the ML model based on the report received from the at least one UE; and to retrain the ML model based on not receiving a report from the at least one UE for a predetermined amount of time after transmitting the at least one of the SCG measurement configuration or the SCG activation indication.

The reception component 1330 is configured, e.g., as described in connection with 1002, 1102, 1106, 1108, 1118, to receive at least one of information associated with an MCG or historical information for an SCG; to receive an indication of the ML model indicative of whether the at least one UE is within the coverage area of the SCG; to receive, from the at least one UE, a second indication of whether the location of the at least one UE is within the coverage area of the SCG; and to receive, from the at least one UE, a report associated with the at least one of the SCG measurement configuration or the SCG activation indication. The transmission component 1334 is configured, e.g., as described in connection with 1116, to transmit, to the at least one UE, at least one of an SCG measurement configuration or an SCG activation indication, if the at least one UE is within the coverage area of the SCG.

The apparatus may include additional components that perform each of the blocks of the algorithm in the flowcharts of FIGS. 10-11. As such, each block in the flowcharts of FIGS. 10-11 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1302 may include a variety of components configured for various functions. In one configuration, the apparatus 1302, and in particular the baseband unit 1304, includes means for receiving at least one of information associated with an MCG or historical information for an SCG; training, based on the at least one of the information associated with the MCG or the historical information for the SCG, an ML model that indicates whether a location of at least one UE is within a coverage area of the SCG; and communicating with the at least one UE based on an indication of the ML model, the indication of the ML model indicative of whether the at least one UE is within the coverage area of the SCG. The apparatus 1302 further includes means for receiving the indication of the ML model indicative of whether the at least one UE is within the coverage area of the SCG. The means for communicating with the at least one UE is further configured to refrain from transmitting, to the at least one UE, an SCG measurement configuration and an SCG activation indication, if the at least one UE is not within the coverage area of the SCG. The means for communicating with the at least one UE is further configured to transmit, to the at least one UE, at least one of an SCG measurement configuration or an SCG activation indication, if the at least one UE is within the coverage area of the SCG.

The apparatus 1302 further includes means for receiving, from the at least one UE, a report associated with the at least one of the SCG measurement configuration or the SCG activation indication; and means for retraining the ML model based on the report received from the at least one UE. The apparatus 1302 further includes means for retraining the ML model based on not receiving a report associated with the at least one of the SCG measurement configuration or the SCG activation indication for a predetermined amount of time after transmitting, to the at least one UE, the at least one of the SCG measurement configuration or the SCG activation indication. The apparatus 1302 further includes means for receiving, from the at least one UE, a second indication of whether the location of the at least one UE is within the coverage area of the SCG. The apparatus 1302 further includes means for weighting the indication of the ML model based on the first level of confidence and the second indication of the second ML model based on the second level of confidence to provide a weighted level of confidence for whether the at least one UE is within the coverage area of the SCG, the communication with the at least one UE based on the weighted level of confidence.

The means may be one or more of the components of the apparatus 1302 configured to perform the functions recited by the means. As described supra, the apparatus 1302 may include the TX Processor 316, the RX Processor 370, and the controller/processor 375. As such, in one configuration, the means may be the TX Processor 316, the RX Processor 370, and the controller/processor 375 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication at a UE including at least one processor coupled to a memory and configured to receive information associated with an MCG; train, based on at least one of the information associated with the MCG or historical information of the UE for an SCG, an ML model that indicates whether a location of the UE is within a coverage area of the SCG; and communicate with a base station based on an indication of the ML model, the indication of the ML model indicative of whether the UE is within the coverage area of the SCG.

Aspect 2 may be combined with aspect 1 and includes that the information associated with the MCG is indicative of at least one of an RSRP, a TA, a PHR, or CSI.

Aspect 3 may be combined with any of aspects 1-2 and includes that the MCG corresponds to at least one of an MCG serving cell, an MCG intra-frequency neighbor cell, or an MCG inter-frequency neighbor cell.

Aspect 4 may be combined with any of aspects 1-3 and includes that the at least one of the RSRP, the TA, the PHR, or the CSI corresponds to at least one of a serving beam of the MCG serving cell, a non-serving beam of the MCG serving cell, a strongest beam of the MCG neighbor cell, or a non-strongest beam of the MCG neighbor cell.

Aspect 5 may be combined with any of aspects 1-4 and includes that the at least one processor is further configured to receive the indication of the ML model indicative of whether the UE is within the coverage area of the SCG.

Aspect 6 may be combined with any of aspects 1-5 and includes that to communicate with the base station the at least one processor is further configured to refrain from transmitting, to the base station, a request for an SCG measurement configuration and an SCG activation indication, if the UE is not within the coverage area of the SCG.

Aspect 7 may be combined with any of aspects 1-5 and includes that to communicate with the base station the at least one processor is further configured to transmit, to the base station, a request for at least one of an SCG measurement configuration or an SCG activation indication, if the UE is within the coverage area of the SCG.

Aspect 8 may be combined with any of aspects 1-5 or 7 and includes that the at least one processor is further configured to: receive the at least one of the SCG measurement configuration or the SCG activation indication; and transmit, to the base station, a report associated with the at least one of the SCG measurement configuration or the SCG activation indication.

Aspect 9 may be combined with any of aspects 1-5 or 7 and includes that the at least one processor is further configured to retrain the ML model based on not receiving the at least one of the SCG measurement configuration or the SCG activation indication for a predetermined amount of time after transmitting, to the base station, the request for the at least one of the SCG measurement configuration or the SCG activation indication.

Aspect 10 may be combined with any of aspects 1-9 and includes that the at least one processor is further configured to transmit, to the base station, the indication of the ML model indicative of whether the location of the UE is within the coverage area of the SCG.

Aspect 11 may be combined with any of aspects 1-10 and includes that the indication of the ML model is based on at least one of the ML model being trained at the UE or the ML model being configured to the UE from the base station.

Aspect 12 may be combined with any of aspects 1-11 and includes that the indication of the ML model is associated with a first level of confidence for being weighted with a second indication of a second ML model at the base station associated with a second level of confidence, the communication with the base station based on a weighted level of confidence for whether the UE is within the coverage area of the SCG.

Aspect 13 may be combined with any of aspects 1-12 and includes that a weight for the indication of the ML model is further based on a capability of the UE.

Aspect 14 may be combined with any of aspects 1-13 and includes that the indication of the ML model indicative of whether the UE is within the coverage area of the SCG is based on a second indication of a second ML model associated with the base station.

Aspect 15 may be combined with any of aspects 1-14 and further includes at least one of an antenna or a transceiver coupled to the at least one processor.

Aspect 16 is an apparatus for wireless communication at a base station including at least one processor coupled to a memory and configured to receive at least one of information associated with an MCG or historical information for an SCG; train, based on the at least one of the information associated with the MCG or the historical information for the SCG, an ML model that indicates whether a location of at least one UE is within a coverage area of the SCG; and communicate with the at least one UE based on an indication of the ML model, the indication of the ML model indicative of whether the at least one UE is within the coverage area of the SCG.

Aspect 17 may be combined with aspect 15 and includes that the information associated with the MCG is indicative of at least one of an RSRP, a TA, a PHR, or CSI.

Aspect 18 may be combined with any of aspects 16-17 and includes that the MCG corresponds to at least one of an MCG serving cell, an MCG intra-frequency neighbor cell, or an MCG inter-frequency neighbor cell.

Aspect 19 may be combined with any of aspects 16-18 and includes that the at least one of the RSRP, the TA, the PHR, or the CSI corresponds to at least one of a serving beam of the MCG serving cell, a non-serving beam of the MCG serving cell, a strongest beam of the MCG neighbor cell, or a non-strongest beam of the MCG neighbor cell.

Aspect 20 may be combined with any of aspects 16-19 and includes that the at least one processor is further configured to receive the indication of the ML model indicative of whether the at least one UE is within the coverage area of the SCG.

Aspect 21 may be combined with any of aspects 16-20 and includes that to communicate with the at least one UE the at least one processor is further configured to refrain from transmitting, to the at least one UE, an SCG measurement configuration and an SCG activation indication, if the at least one UE is not within the coverage area of the SCG.

Aspect 22 may be combined with any of aspects 16-20 and includes that to communicate with the at least one UE the at least one processor is further configured to transmit, to the at least one UE, at least one of an SCG measurement configuration or an SCG activation indication, if the at least one UE is within the coverage area of the SCG.

Aspect 23 may be combined with any of aspects 16-20 or 22 and includes that the at least one processor is further configured to: receive, from the at least one UE, a report associated with the at least one of the SCG measurement configuration or the SCG activation indication; and retrain the ML model based on the report received from the at least one UE.

Aspect 24 may be combined with any of aspects 16-20 or 22 and includes that the at least one processor is further configured to retrain the ML model based on not receiving a report associated with the at least one of the SCG measurement configuration or the SCG activation indication for a predetermined amount of time after transmitting, to the at least one UE, the at least one of the SCG measurement configuration or the SCG activation indication.

Aspect 25 may be combined with any of aspects 16-24 and includes that the at least one processor is further configured to receive, from the at least one UE, a second indication of whether the location of the at least one UE is within the coverage area of the SCG.

Aspect 26 may be combined with any of aspects 16-25 and includes that the second indication is based on at least one of the ML model being configured to the at least one UE or a second ML model that is trained at the at least one UE.

Aspect 27 may be combined with any of aspects 16-26 and includes that the indication of the ML model is associated with a first level of confidence and the second indication of the second ML model is associated with a second level of confidence, the at least one processor further configured to: weight the indication of the ML model based on the first level of confidence and the second indication of the second ML model based on the second level of confidence to provide a weighted level of confidence for whether the at least one UE is within the coverage area of the SCG, the communication with the at least one UE based on the weighted level of confidence.

Aspect 28 may be combined with any of aspects 16-27 and includes that a weight for the second indication of the second ML model is further based on a capability of the at least one UE.

Aspect 29 may be combined with any of aspects 16-28 and further includes at least one of an antenna or a transceiver coupled to the at least one processor.

Aspect 30 is a method of wireless communication for implementing any of aspects 1-29.

Aspect 31 is an apparatus for wireless communication including means for implementing any of aspects 1-29.

Aspect 32 is a computer-readable medium storing computer executable code, the code when executed by at least one processor causes the at least one processor to implement any of aspects 1-29.

What is claimed is:

1. An apparatus for wireless communication at a user equipment (UE), comprising:
    at least one of a transceiver or an antenna;
    memory; and
    at least one processor coupled to the memory and coupled to at least one of the transceiver or the antenna, wherein the at least one processor is configured to:
        receive information associated with a master cell group (MCG);
        train, based on at least one of the information associated with the MCG or historical information of the UE for a secondary cell group (SCG), a machine learning (ML) model that indicates whether a location of the UE is within a coverage area of the SCG; and
        communicate, via at least one of the transceiver or the antenna, with a base station based on an indication of the ML model, the indication of the ML model indicative of whether the UE is within the coverage area of the SCG.

2. The apparatus of claim 1, wherein the information associated with the MCG is indicative of at least one of a reference signal received power (RSRP), a timing advance (TA), a power headroom (PHR), or channel state information (CSI).

3. The apparatus of claim 2, wherein the MCG corresponds to at least one of an MCG serving cell, an MCG intra-frequency neighbor cell, or an MCG inter-frequency neighbor cell.

4. The apparatus of claim 3, wherein the at least one of the RSRP, the TA, the PHR, or the CSI corresponds to at least one of a serving beam of the MCG serving cell, a non-serving beam of the MCG serving cell, a strongest beam of the MCG neighbor cell, or a non-strongest beam of the MCG neighbor cell.

5. The apparatus of claim 1, wherein the at least one processor is further configured to receive the indication of the ML model indicative of whether the UE is within the coverage area of the SCG.

6. The apparatus of claim 1, wherein to communicate with the base station the at least one processor is further configured to refrain from transmitting, to the base station, a request for an SCG measurement configuration and an SCG activation indication, if the UE is not within the coverage area of the SCG.

7. The apparatus of claim 1, wherein to communicate with the base station the at least one processor is further configured to transmit, to the base station, a request for at least one of an SCG measurement configuration or an SCG activation indication, if the UE is within the coverage area of the SCG.

8. The apparatus of claim 7, wherein the at least one processor is further configured to:
    receive the at least one of the SCG measurement configuration or the SCG activation indication; and
    transmit, to the base station, a report associated with the at least one of the SCG measurement configuration or the SCG activation indication.

9. The apparatus of claim 7, wherein the at least one processor is further configured to retrain the ML model based on not a lack of reception of the at least one of the SCG measurement configuration or the SCG activation indication for a predetermined amount of time after the transmission, to the base station, of the request for the at least one of the SCG measurement configuration or the SCG activation indication.

10. The apparatus of claim 1, wherein the at least one processor is further configured to transmit, to the base station, the indication of the ML model indicative of whether the location of the UE is within the coverage area of the SCG.

11. The apparatus of claim 10, wherein the indication of the ML model is based on at least one of the ML model being trained at the UE or the ML model being configured to the UE from the base station.

12. The apparatus of claim 10, wherein the indication of the ML model is associated with a first level of confidence for being weighted with a second indication of a second ML model at the base station associated with a second level of confidence, the communication with the base station based on a weighted level of confidence for whether the UE is within the coverage area of the SCG.

13. The apparatus of claim 12, wherein a weight for the indication of the ML model is further based on a capability of the UE.

14. The apparatus of claim 1, wherein the indication of the ML model indicative of whether the UE is within the coverage area of the SCG is based on a second indication of a second ML model associated with the base station.

15. An apparatus for wireless communication at a base station, comprising:
at least one of a transceiver or an antenna;
memory; and
at least one processor coupled to the memory and coupled to at least one of the transceiver or the antenna, wherein the at least one processor is configured to:
receive at least one of information associated with a master cell group (MCG) or historical information for a secondary cell group (SCG);
train, based on the at least one of the information associated with the MCG or the historical information for the SCG, a machine learning (ML) model that indicates whether a location of at least one user equipment (UE) is within a coverage area of the SCG; and
communicate, via at least one of the transceiver or the antenna, with the at least one UE based on an indication of the ML model, the indication of the ML model indicative of whether the at least one UE is within the coverage area of the SCG.

16. The apparatus of claim 15, wherein the information associated with the MCG is indicative of at least one of a reference signal received power (RSRP), a timing advance (TA), a power headroom (PHR), or channel state information (CSI).

17. The apparatus of claim 16, wherein the MCG corresponds to at least one of an MCG serving cell, an MCG intra-frequency neighbor cell, or an MCG inter-frequency neighbor cell.

18. The apparatus of claim 17, wherein the at least one of the RSRP, the TA, the PHR, or the CSI corresponds to at least one of a serving beam of the MCG serving cell, a non-serving beam of the MCG serving cell, a strongest beam of the MCG neighbor cell, or a non-strongest beam of the MCG neighbor cell.

19. The apparatus of claim 15, wherein the at least one processor is further configured to receive the indication of the ML model indicative of whether the at least one UE is within the coverage area of the SCG.

20. The apparatus of claim 15, wherein to communicate with the at least one UE the at least one processor is further configured to refrain from transmitting, to the at least one UE, an SCG measurement configuration and an SCG activation indication, if the at least one UE is not within the coverage area of the SCG.

21. The apparatus of claim 15, wherein to communicate with the at least one UE the at least one processor is further configured to transmit, to the at least one UE, at least one of an SCG measurement configuration or an SCG activation indication, if the at least one UE is within the coverage area of the SCG.

22. The apparatus of claim 21, wherein the at least one processor is further configured to:
receive, from the at least one UE, a report associated with the at least one of the SCG measurement configuration or the SCG activation indication; and
retrain the ML model based on the report received from the at least one UE.

23. The apparatus of claim 21, wherein the at least one processor is further configured to retrain the ML model based on a lack of a reception of a report associated with the at least one of the SCG measurement configuration or the SCG activation indication for a predetermined amount of time after the transmission, to the at least one UE, of the at least one of the SCG measurement configuration or the SCG activation indication.

24. The apparatus of claim 15, wherein the at least one processor is further configured to receive, from the at least one UE, a second indication of whether the location of the at least one UE is within the coverage area of the SCG.

25. The apparatus of claim 24, wherein the second indication is based on at least one of the ML model being configured to the at least one UE or a second ML model that is trained at the at least one UE.

26. The apparatus of claim 24, wherein the indication of the ML model is associated with a first level of confidence and the second indication of the second ML model is associated with a second level of confidence, wherein the at least one processor is further configured to:
weight the indication of the ML model based on the first level of confidence and the second indication of the second ML model based on the second level of confidence to provide a weighted level of confidence for whether the at least one UE is within the coverage area of the SCG, the communication with the at least one UE based on the weighted level of confidence.

27. A method of wireless communication at a user equipment (UE), comprising:
receiving information associated with a master cell group (MCG);
training, based on at least one of the information associated with the MCG or historical information of the UE for a secondary cell group (SCG), a machine learning (ML) model that indicates whether a location of the UE is within a coverage area of the SCG; and
communicating with a base station based on an indication of the ML model, the indication of the ML model indicative of whether the UE is within the coverage area of the SCG.

28. A method of wireless communication at a base station, comprising:
receiving at least one of information associated with a master cell group (MCG) or historical information for a secondary cell group (SCG);
training, based on the at least one of the information associated with the MCG or the historical information for the SCG, a machine learning (ML) model that indicates whether a location of at least one user equipment (UE) is within a coverage area of the SCG; and
communicating with the at least one UE based on an indication of the ML model, the indication of the ML model indicative of whether the at least one UE is within the coverage area of the SCG.

29. The method of claim 27, wherein the information associated with the MCG is indicative of at least one of a reference signal received power (RSRP), a timing advance (TA), a power headroom (PHR), or channel state information (CSI).

30. The method of claim 29, wherein the MCG corresponds to at least one of an MCG serving cell, an MCG intra-frequency neighbor cell, or an MCG inter-frequency neighbor cell.

31. The method of claim 30, wherein the at least one of the RSRP, the TA, the PHR, or the CSI corresponds to at least one of a serving beam of the MCG serving cell, a non-serving beam of the MCG serving cell, a strongest beam of the MCG neighbor cell, or a non-strongest beam of the MCG neighbor cell.

32. The method of claim 27, further comprising receiving the indication of the ML model indicative of whether the UE is within the coverage area of the SCG.

33. The method of claim 27, wherein communicating with the base station comprises refraining from transmitting, to the base station, a request for an SCG measurement configuration and an SCG activation indication, if the UE is not within the coverage area of the SCG.

34. The method of claim 27, wherein communicating with the base station comprises transmitting, to the base station, a request for at least one of an SCG measurement configuration or an SCG activation indication, if the UE is within the coverage area of the SCG.

35. The method of claim 34, further comprising:
receiving the at least one of the SCG measurement configuration or the SCG activation indication; and
transmitting, to the base station, a report associated with the at least one of the SCG measurement configuration or the SCG activation indication.

36. The method of claim 34, further comprising retraining the ML model based on not receiving the at least one of the SCG measurement configuration or the SCG activation indication for a predetermined amount of time after transmitting, to the base station, the request for the at least one of the SCG measurement configuration or the SCG activation indication.

37. The method of claim 27, further comprising transmitting, to the base station, the indication of the ML model indicative of whether the location of the UE is within the coverage area of the SCG.

38. The method of claim 37, wherein the indication of the ML model is based on at least one of the ML model being trained at the UE or the ML model being configured to the UE from the base station.

39. The method of claim 37, wherein the indication of the ML model is associated with a first level of confidence for being weighted with a second indication of a second ML model at the base station associated with a second level of confidence, the communication with the base station based on a weighted level of confidence for whether the UE is within the coverage area of the SCG.

40. The method of claim 39, wherein a weight for the indication of the ML model is further based on a capability of the UE.

41. The method of claim 27, wherein the indication of the ML model indicative of whether the UE is within the coverage area of the SCG is based on a second indication of a second ML model associated with the base station.

42. The method of claim 28, wherein the information associated with the MCG is indicative of at least one of a reference signal received power (RSRP), a timing advance (TA), a power headroom (PHR), or channel state information (CSI).

43. The method of claim 42, wherein the MCG corresponds to at least one of an MCG serving cell, an MCG intra-frequency neighbor cell, or an MCG inter-frequency neighbor cell.

44. The method of claim 43, wherein the at least one of the RSRP, the TA, the PHR, or the CSI corresponds to at least one of a serving beam of the MCG serving cell, a non-serving beam of the MCG serving cell, a strongest beam of the MCG neighbor cell, or a non-strongest beam of the MCG neighbor cell.

45. The method of claim 28, further comprising receiving the indication of the ML model indicative of whether the at least one UE is within the coverage area of the SCG.

46. The method of claim 28, wherein communicating with the at least one UE comprises refraining from transmitting, to the at least one UE, an SCG measurement configuration and an SCG activation indication, if the at least one UE is not within the coverage area of the SCG.

47. The method of claim 28, wherein communicating with the at least one UE comprises transmitting, to the at least one UE, at least one of an SCG measurement configuration or an SCG activation indication, if the at least one UE is within the coverage area of the SCG.

48. The method of claim 47, further comprising:
receiving, from the at least one UE, a report associated with the at least one of the SCG measurement configuration or the SCG activation indication; and
retraining the ML model based on the report received from the at least one UE.

49. The method of claim 47, further comprising retraining the ML model based on not receiving a report associated with the at least one of the SCG measurement configuration or the SCG activation indication for a predetermined amount of time after transmitting, to the at least one UE, the at least one of the SCG measurement configuration or the SCG activation indication.

50. The method of claim 28, further comprising receiving, from the at least one UE, a second indication of whether the location of the at least one UE is within the coverage area of the SCG.

51. The method of claim 50, wherein the second indication is based on at least one of the ML model being configured to the at least one UE or a second ML model that is trained at the at least one UE.

52. The method of claim 50, wherein the indication of the ML model is associated with a first level of confidence and the second indication of the second ML model is associated with a second level of confidence, the method further comprising:
weighting the indication of the ML model based on the first level of confidence and the second indication of the second ML model based on the second level of confidence to provide a weighted level of confidence for whether the at least one UE is within the coverage area of the SCG, the communication with the at least one UE based on the weighted level of confidence.

* * * * *